(12) United States Patent
Pathak et al.

(10) Patent No.: US 11,289,248 B2
(45) Date of Patent: Mar. 29, 2022

(54) MODIFIED LA—FE—SI MAGNETOCALORIC ALLOYS

(71) Applicant: Iowa State University Research Foundation, Inc., Ames, IA (US)

(72) Inventors: Arjun K. Pathak, Ames, IA (US); Yaroslav Mudryk, Ames, IA (US); Oleksandr Dolotko, Ames, IA (US); Vitalij K. Pecharsky, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 213 days.

(21) Appl. No.: 16/501,027

(22) Filed: Feb. 11, 2019

(65) Prior Publication Data

US 2019/0272933 A1 Sep. 5, 2019

Related U.S. Application Data

(60) Provisional application No. 62/710,968, filed on Mar. 5, 2018.

(51) Int. Cl.

| | |
|---|---|
| *H01F 1/01* | (2006.01) |
| *C22C 38/06* | (2006.01) |
| *C22C 38/02* | (2006.01) |
| *C22C 33/04* | (2006.01) |
| *B33Y 70/00* | (2020.01) |
| *C22C 38/00* | (2006.01) |

(52) U.S. Cl.
CPC .............. *H01F 1/015* (2013.01); *B33Y 70/00* (2014.12); *C22C 33/04* (2013.01); *C22C 38/005* (2013.01); *C22C 38/02* (2013.01); *C22C 38/06* (2013.01); *C22C 2202/02* (2013.01)

(58) Field of Classification Search
CPC ....... H01F 1/015; C22C 38/005; C22C 33/04; C22C 38/02
See application file for complete search history.

(56) References Cited

U.S. PATENT DOCUMENTS

| | | | |
|---|---|---|---|
| 7,186,303 B2 | 3/2007 | Kogure et al. | 148/101 |
| 9,657,971 B2 | 5/2017 | Hu et al. | 62/3.1 |
| 2014/0166159 A1 | 6/2014 | Chen et al. | 148/122 |
| 2018/0043435 A1* | 2/2018 | Kikkawa | B22F 3/14 |

OTHER PUBLICATIONS

A. Fujita et al., Itinerant-electron metamagnetic transition and magnetocalorica effects in La(FexSi1-x) compounds and their hydrides, Physical Review B, 67, 104416, 2003.
O. Gutfleisch et al., Mastering hysteresis in magnetocaloric materials, Phil. Trans. R. Soc. A 374, Mar. 8, 2015, 2017.

(Continued)

*Primary Examiner* — Nicholas A Wang
*Assistant Examiner* — Jiangtian Xu

(57) ABSTRACT

A magnetocaloric material comprising a La—Fe—Si based alloy composition that is compositionally modified to include a small but effective amount of at least one of Al, Ga, and In to improve mechanical stability of the alloy (substantially reduce alloy brittleness), improve thermal conductivity, and preserve comparable or provide improved magnetocaloric effects. The alloy composition may be further modified by inclusion of at least one of Co, Mn, Cr, and V as well as interstitial hydrogen.

4 Claims, 25 Drawing Sheets

(56) References Cited

OTHER PUBLICATIONS

Julia Lyubina et al., Multiple Metamagnetic Transitions in the Magnetic Refrigerant La(Fe,Si)13Hx, Physical Review Letters, 101, 177202, 2008.
Arjun K. Pathak et al., Magnetic, magnetocaloric, and magnetoelastic properties of LaFe11.57Si1.43Bx compounds, Journal of Applied Physics, 106, 063917, 2009.
Iliya A. Radulov et al., On the preparation of La(Fe,Mn, Si)13Hx polymer-composites with optimized magnetocaloric properties, Journal of Magnetism and Magnetic Materials, 396, 228, 2015.
S. Fujieda et al, Large Magnetocaloric effect in La(FexSi1-1-x)13 interant-electron metamagnetic compounds, Appl. Phys. Lett. 81, 1276, 2002.
N.H. Dung et al, Mixed Magnetism for Refrigeration and Energy Conversion, Adv. Ener. Mat., V-1, 12115, 2011.
N. Wada et al, Giant magnetoicaloric effect in MnAs1-xSbx Appl. Phys. Lett. 79, 3302, 2001.
Y.K. Fang et al, Large low-field magnetocaloric effect in MnCo0.95Ge1.14 alloy, Scripta Materiala, 57, 453, 2007.
S. Yu Dan'kov et al, Magnetic phase transitions and the magnetothermal properties of gadolinium, Physical Review B, vol. 57, No. 6, 3478, 1998.
K.A. Gschneidner et al, Recent developments in magnetocaloric materials, Rep. Prog. Phys., V-68, 1479, 2005.
V.K. Pecharsky et al, Giant Magnetocaloric Efect in Gd5(Si2Ge2), Physical Review Letters, V-78, 4494, 1997.

\* cited by examiner

MODIFIED LA—FE—SI MAGNETOCALORIC ALLOYS

RELATED APPLICATION

This application claims benefit and priority of provisional application Ser. No. 62/710,968 filed Mar. 5, 2018, the entire disclosure of which is incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to magnetocaloric materials based on the La—Fe—Si alloy system compositionally modified to improve mechanical stability, such as substantially reduced brittleness, improve thermal conductivity, and preserve analogous or even higher magnetocaloric effects compared to other known and commercially available La—Fe—Si based magnetocaloric materials for use as working bodies in magnetocaloric heat pumping applications, including as magnetic refrigerant materials.

BACKGROUND OF THE INVENTION

The ability of magnetic materials to change their temperature due to variation of applied magnetic field (magnetocaloric effect, MCE) is a physical phenomenon that could lead to the realization of clean, highly energy efficient refrigeration and heat pumping systems. However, for this to be realized, magnetic materials should possess (i) large MCE, both magnetic entropy change, $\Delta S_M$, and adiabatic temperature change, $\Delta T_{ad}$, in magnetic field less than 2 Tesla, which is the current limit for permanent magnets, and (ii) Curie temperature near about 300K for room temperature application. In addition the materials should be reasonably inexpensive, mechanically and chemically stable, and contain no toxic elements.

Various alloy systems have been proposed as potential magnetocaloric materials including $La(Fe,Si)_{13}$ [1], $Fe_2P$-type compounds [2], MnAs [3], Heusler alloys (MnCoGe-based alloys) [4], $Fe_{49}Rh_{51}$ [5], rare earth based materials (Gd and $Gd_5Si_{2-x}Ge_x$) [6,7] among other. However, all of them have one or more of the following disadvantages: contain toxic, critical, or expensive elements, exhibit small magnetocaloric effect at desired magnetic field of 2 Tesla or lower, have low Curie temperature, or poor mechanical properties, such as excessive brittleness for the $La(Fe,Si)_{13}$ materials, which readily suffer from decrepitation or disintegration upon handling and, especially, upon thermal and magnetic cycling during operation of a magnetocaloric heat pump.

SUMMARY OF THE INVENTION

The present invention relates to magnetocaloric materials based on the La—Fe—Si alloy system, such as for example the $LaFe_{13-z}Si_z$ system, where $1.1 \leq z \leq 1.9$ modified by inclusion of a small but effective amount of at least one of Al, Ga, and In to improve the inherent mechanical stability of the alloy in terms of substantially reducing its brittleness and increasing its handle-ability and mechanical stability during processing and use operations, while preserving similar or providing even higher magnetocaloric effects compared to other known and commercially available La—Fe—Si based magnetocaloric materials. To this end, certain illustrative embodiments include at least one of Al, Ga, and In in an amount of 0.07 atomic % to 3.5 atomic %, individually or collectively.

A further illustrative embodiment of the present invention involves a first-order phase-transition magnetocaloric alloy represented by $LaFe_{13-z}Si_{z-y}X_y$ where $1.1 \leq z \leq 1.9$, and X is at least one of Al, Ga and/or In present in an amount $0.01 \leq y \leq 0.5$ (i.e., from 0.07 atomic % to 3.5 atomic %) which is effective to substantially reduce alloy brittleness, enabling the alloy to be handled in one's hand and/or to serve as a working body in a magnetocaloric heat pumping device without decrepitation or disintegration. Another illustrative embodiment of the present invention involves the above first-order phase-transition magnetocaloric alloy that further includes M which is at least one of Co, Mn, Cr, and V substituted for Fe in the modified La—Fe—Si based alloy composition. Still another illustrative of the present invention involves including interstitial hydrogen in the modified La—Fe—Si based alloy composition.

The present invention envisions in certain embodiments magnetocaloric alloys, both as bulk arc-melt/drop-cast, as heat treated, and/or as rapidly solidified (using melt spinning, any method of atomization, splat cooling, or any other rapid solidification technique) having one of the following compositions:

a. $LaFe_{13-z}Si_{z-y}X_y$, where X=Al, Ga, In with $1.1 \leq z \leq 1.9$ and $0.01 \leq y \leq 0.5$ b. $La(Fe_{1-w}M_w)_{13-z}Si_{z-y}X_y$, where X=Al, Ga, In, and M=Co, Mn, Cr, V with $0.05 \leq w \leq 0.1$, and $1.1 \leq z \leq 1.9$, and $0.01 \leq y \leq 0.5$ c. $LaFe_{13-z}Si_{z-y}X_yH_v$, where X=Al, Ga, In with $1.1 \leq z \leq 1.9$, $0.01 \leq y \leq 0.5$, $0 < v \leq 2.3$ d. $La(Fe_{1-w}M_w)_{13-z}Si_{z-y}X_yH_v$, where X=Al, Ga, In, and M=Co, Mn, Cr, V with $0.05 \leq w \leq 0.1$, and $1.1 \leq z \leq 1.9$, and $0.01 \leq y \leq 0.5$, and $0 < v \leq 2.3$ and exhibiting large magnetocaloric effect tunable between about 170K and about 350 K as well as having improved mechanical stability and even some machinability.

The present invention provides a magnetic regenerator prepared from alloy compositions set forth above. The regenerator may be used in any form such as including, but not limited to, packed alloy particles, such as for example packed spheres or irregularly-shaped particles, or stacked parallel alloy plates. The regenerator can comprise 3D-printed spherical alloy particles and/or 3D-printed irregularly shaped alloy particles. The present invention also provides a magnetic refrigerator or heat pump using such regenerators.

Additional details and advantages of the present invention will become readily apparent to those skilled in the art from the following detailed description, wherein only the illustrative embodiments of the invention are shown and described. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
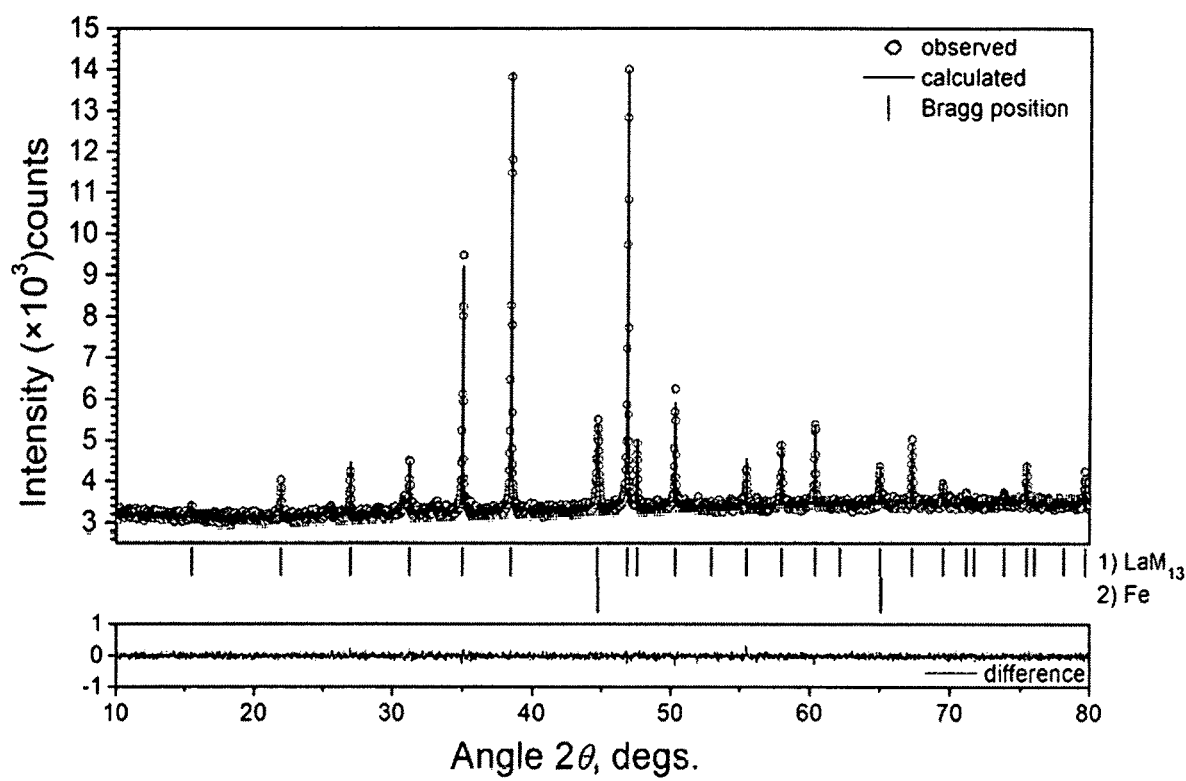
FIG. 1 shows Rietveld refinement of x-ray powder diffraction (XRD) pattern of $LaFe_{13-z}Si_{z-y}X_y$, where X=In, $z=1.2$ and $y=0.1$, i.e., $LaFe_{11.8}Si_{11.1}In_{0.1}$ sample after arc-melting, drop casting and heat treatment. Vertical bars underneath the main panel mark calculated positions of Bragg peaks of the phases present in the sample: $LaFe_{11.8}Si_{1.1}In_{0.1}$ (labeled as $LaM_{13}$) and Fe. The bottom panel shows the difference between the observed and calculated intensities.

Embodiments of the present invention relate to certain magnetocaloric materials that exhibit the so-called magnetocaloric effect, which is a thermal response of the material when subject to an external applied magnetic field change. The magnetocaloric effect is more prominent closer to large magnetization changes in respect to the temperature, i.e., at magnetic transitions. Different magnetic transitions may present large magnetocaloric effect: ferromagnetic (FM) to paramagnetic (PM); antiferromagnetic (AFM) to FM; spin glass to FM; etc.

The present invention embodies new chemical compositions that lead to improvements of La—Fe—Si based magnetocaloric alloys, such as the first-order phase-transition $LaFe_{13-z}Si_z$ system, where $1.1 \leq z \leq 1.9$, which are achieved by inclusion of a small but effective amount of at least one of Group 13 elements; Al, Ga, and/or In, to improve mechanical stability of the solid alloys by significantly reducing their brittleness, enabling the solid alloys to be manually handled and serve as working bodies in magnetic regenerators without decrepitation (breaking apart) or disintegration from the handling or during operation. Moreover, this improvement is achieved while preserving the NaZn$_{13}$-type crystal structure and preserving similar or providing even higher magnetocaloric effects as compared to other known and commercially available La—Fe—Si based magnetocaloric materials. Certain illustrative embodiments include at least one of Al, Ga, and/or In in the alloys in an amount of 0.07 atomic % to 3.5 atomic % to this end. These improvements are achieved in bulk arc-melt/drop-cast condition, and/or in heat treated condition, and/or in rapidly solidified condition (after melt spinning, atomization, or after any other rapid solidification technique). Moreover, the materials do not disintegrate or decrepitate after hydrogenation.

Certain illustrative embodiments of the present invention involve substituting at least one of Al, Ga, and/or In for at least some Si in the La—Fe—Si based alloy composition. Optionally, at least one of Co, Mn, Cr, and V can be substituted for Fe in the modified La—Fe—Si based alloy composition (i.e. modified with at least one of Al, Ga, In), and interstitial hydrogen optionally can be included in the modified La—Fe—Si based alloy composition. Another illustrative embodiment of the present invention involves the above first-order phase-transition magnetocaloric alloy that further includes M which is at least one of Co, Mn, Cr, and V substituted for Fe in the modified La—Fe—Si based alloy composition. Such alloy compositions are formulated by cheap and easily processed elements with large mechanical integrity.

The modified La—Fe—Si alloy compositions can be chemically tailored as just described in a manner to tune the magneto-structural transition temperatures of the materials; for example, to provide a large magnetocaloric effect that is tunable between about 170 K and about 350 K. Such alloys exhibit metamagnetic transitions from the paramagnetic states in zero or low magnetic fields (generally less than 0.1 Tesla) into ferromagnetic states when induced by the magnetic field of 0.5 Tesla or higher applied at or near the respective Curie temperature. The metamagnetic transitions proceed with phase volume change but without crystal symmetry change. A reverse metamagnetic transition occurs when the high magnetic field is reduced back to less than 0.1 Tesla. The magneto-structural transition temperatures of the modified alloy compositions also may be controlled by alloy chemistries and/or finely tuned by heat-treatments.

Illustrative embodiments of chemically modified alloy compositions pursuant to embodiments of the invention include, but are not limited to, the following compositions:
  a. LaFe$_{13-z}$Si$_{z-y}$X$_y$, where X=Al, Ga, In with $1.1 \leq z \leq 1.9$ and $0.01 \leq y \leq 0.5$
  b. La(Fe$_{1-w}$M$_w$)$_{13-z}$Si$_{z-y}$X$_y$, where X=Al, Ga, In, and M=Co, Mn, Cr, V with $0.05 \leq w \leq 0.1$, and $1.1 \leq z \leq 1.9$, and $0.01 \leq y \leq 0.5$
  c. LaFe$_{13-z}$Si$_{z-y}$X$_y$H$_v$, where X=Al, Ga, In with $1.1 \leq z \leq 1.9$, $0.01 \leq y \leq 0.5$, $0 < v \leq 2.3$
  d. La(Fe$_{1-w}$M$_w$)$_{13-z}$Si$_{z-y}$X$_y$H$_v$, where X=Al, Ga, In, and M=Co, Mn, Cr, V with $0.05 \leq w \leq 0.1$, and $1.1 \leq z \leq 1.9$, and $0.01 \leq y \leq 0.5$, and $0 < v \leq 2.3$ and exhibiting large magnetocaloric effect tunable between about 170K and about 350 K as well as having improved mechanical stability and even some machinability.

The magnetocaloric alloys can be made with improved properties both in bulk arc-melt/drop-cast condition with subsequent heat treatment and in rapidly solidified condition (melt spinning, any atomization method, e.g., gas atomization, or any other rapid solidification technique). An illustrative processing method involves arc-melting the elemental components of the alloy composition in the correct stoichiometry, or with an excess of 3.5 wt. % Mn, if used, to account for its loss due to evaporation. The solidified material is then (optional step) drop-cast from a high temperature molten state to form a more chemically homogeneous casting. The casting can be then re-melted and re-solidified, and subjected to a homogenizing heat treatment. Alternately, the casting can be rapidly solidified; for example, using melt-spinning, splat cooling or atomization. For example, the melt-spun ribbons are prepared using induction melting of ingots in a quartz crucible at ⅓ atmosphere pressure of high purity He gas at the temperature of approximately 1570 K, and then ejected at approximately 0.1 atmosphere overpressure of helium at onto a copper chill wheel rotating at a tangential speed of about 25 to 50 m/s, which are common parameters of the melt-spinning technique. The parent phase is easily formed and stable. Other methods of rapid solidification of molten alloy composition can be utilized including, but not limited to atomization, selective laser melting, and 3D printing. A regenerator can be custom designed and fabricated using spherical and/or irregular particles of the modified La—Fe—Si alloy pursuant to embodiments of the invention (without or with appropriate binder) using 3D printing technology using direct metal laser sintering, selective laser sintering, and/or powder bed and inkjet head 3D printing.

Following drop casting or rapid solidification, the solidified alloy material may then be heat-treated at a temperature and for a time to crystallize any possible remains of amorphous material, and/or to complete solid state reactions, and/or to release internal stress after the rapid quenching.

The rapidly solidified alloy material, or the heat treated alloy material from the preceding paragraphs, may be subjected to optional annealing heat treatment at different temperatures and times to closely control the magneto-structural transition temperature of the material and thus the operation temperature of magnetic refrigeration material.

The following examples are offered to further illustrate but not limit embodiments of the present invention:

EXAMPLES

Example 1

Alloy Preparation

Approximately 10 gm of a stoichiometric LaFe$_{13-z}$Si$_{z-y}$X$_y$, where X=Al, Ga and/or In, and $1.1 \leq z \leq 1.9$ and $0.01 \leq y \leq 0.5$ alloys were prepared by arc melting process. Alloy compositions were prepared with high purity elements Fe, Si, and X being weighed stoichiometrically and arc melted three to five times under argon atmosphere followed by addition of high purity La and arc melting three to five times under high purity argon atmosphere. The arc melted buttons were then drop-cast into an about 1 cm diameter ingot for a finer grain size and homogeneous solidification structure throughout the ingot.

The alloy compositions so made are represented by:
LaFe$_{11.8}$Si$_{1.1}$In$_{0.1}$
LaFe$_{11.8}$Si$_{1.1}$Al$_{0.1}$
LaFe$_{11.8}$Si$_{1.1}$Ga$_{0.1}$
LaFe$_{11.5}$Si$_{1.4}$In$_{0.1}$ The as-prepared, drop-cast alloys were heat treated at 1050° C. for two weeks followed by slow cooling to room temperature. Room temperature x-ray diffraction (XRD) confirmed formation of the major phase with NaZn$_{13}$-type crystal structure containing about 10-20% by volume of α-iron as an impurity phase, the presence of which did not deteriorate the value of the magnetic entropy change, yet the alloys demonstrated much improved mechanical stability.

In particular, improvement in mechanical stability of the heat treated solid alloys was evidenced by their being able to be manually handled and tested as described below without decrepitation, disintegrating, or shattering if dropped as a result of their substantially reduced alloy brittleness. In contrast, the parent heat treated solid alloys (i.e. the same alloys without inclusion of Al, Ga, and/or In) are excessively brittle and disintegrate in one's hand with the slightest of manipulation, and they also decrepitate on their own upon hydrogenation due to an intrinsic volume expansion.

Example 2

Hydrogenation

The Curie temperature of the alloy samples of Example 1 can be increased to and above room temperature by proper hydrogenation of the alloys, which preserves the strong metamagnetic transition thereby keeping the large magnetocaloric effect of the alloys. In order to bring the Curie temperature close to room temperature, several drop cast alloys were hydrogenated. Hydrogenation can be effected by annealing the heat treated solid alloy in a high purity hydrogen or hydrogen-containing atmosphere for a time sufficient for the alloy to absorb interstitial hydrogen. For example, the following procedure was used to introduce interstitial hydrogen into each of certain alloy samples, as illustrated below for $LaFe_{13-z}Si_{z-y}X_y$, where X=In, z=1.2, and y=0.1, i.e., for the alloy with $LaFe_{11.8}Si_{1.1}In_{0.1}$ composition. Each sample received multiple activations set forth below.

First Activation:

Each $LaFe_{11.8}Si_{1.1}In_{0.1}$ sample was loaded in an autoclave.

The sample was heated to 300° C. for about 6 h in vacuum. After this the sample was cooled to 230° C. and kept at this temperature overnight (about 17 hours) under vacuum.

While keeping sample at 230° C., the reservoir was pressurized to about 5 bar hydrogen pressure ($V_{(reservoir)}$=12.26 ml, $V_{(autoclave)}$=16.704 ml) and kept at the hydrogen atmosphere for 24 hours.

After that the sample was evacuated, and while keeping sample in vacuum, heated to 360° C., held at this temperature for 1 hour. After full dehydrogenation the sample was cooled down to room temperature with a cooling rate of 1° C./min.

Figure 2:
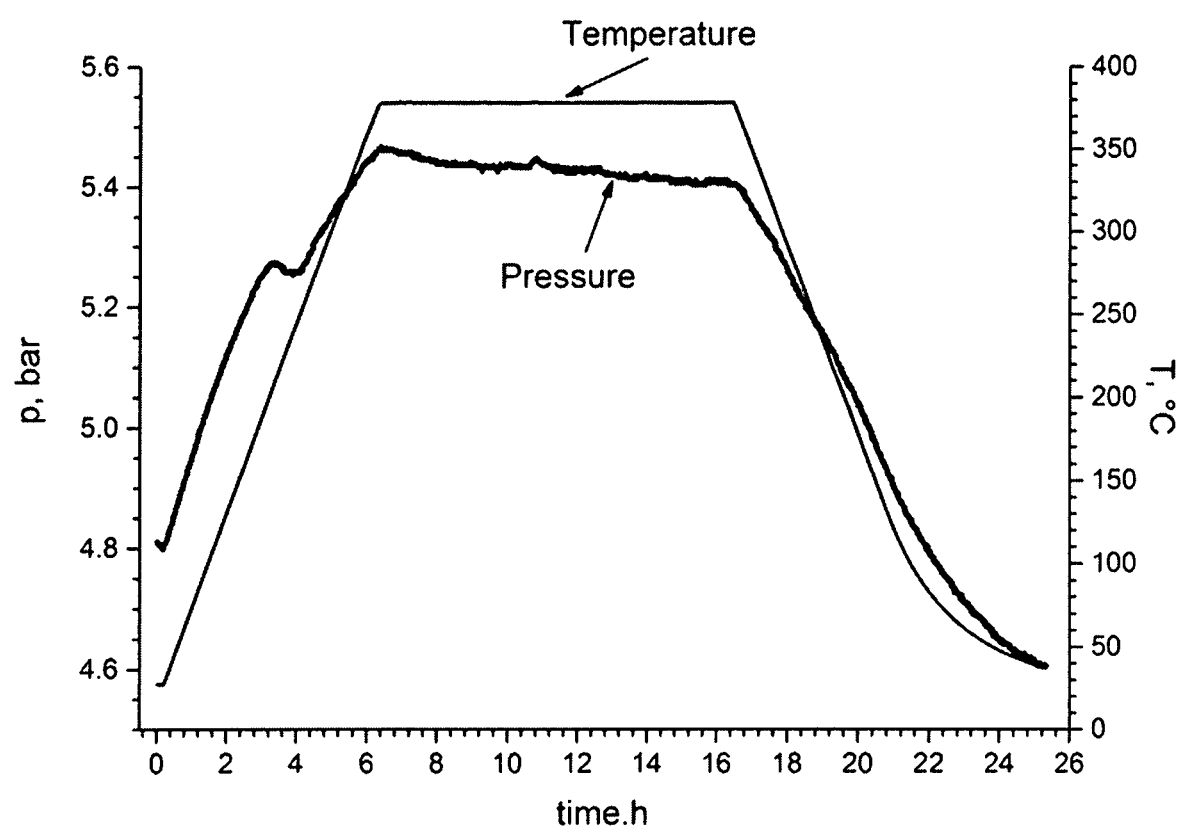
FIG. 2 shows hydrogen absorption kinetics of $LaFe_{13-z}Si_{z-y}X_y$, where $X=In$, $z=1.2$ and $y=0.1$, i.e., $LaFe_{11.8}Si_{1.1}In_{0.1}$ sample during the second activation cycle.

Second Activation (FIG. 2) of the Sample:

At room temperature the same sample was pressurized to about 5 bar hydrogen pressure. When the measurement was started, the sample was heated to 360° C. at a rate 1° C./min.

After the temperature reached 360° C., the sample was kept for 10 hours at this temperature in hydrogen atmosphere.

Then the sample was cooled down to room temperature in a cooling rate of 1° C./min.

After this the sample was evacuated at room temperature.

Keeping the sample under vacuum the autoclave was heated to 360° C., kept at this temperature for 5 hours and cooled to room temperature.

Figure 3:
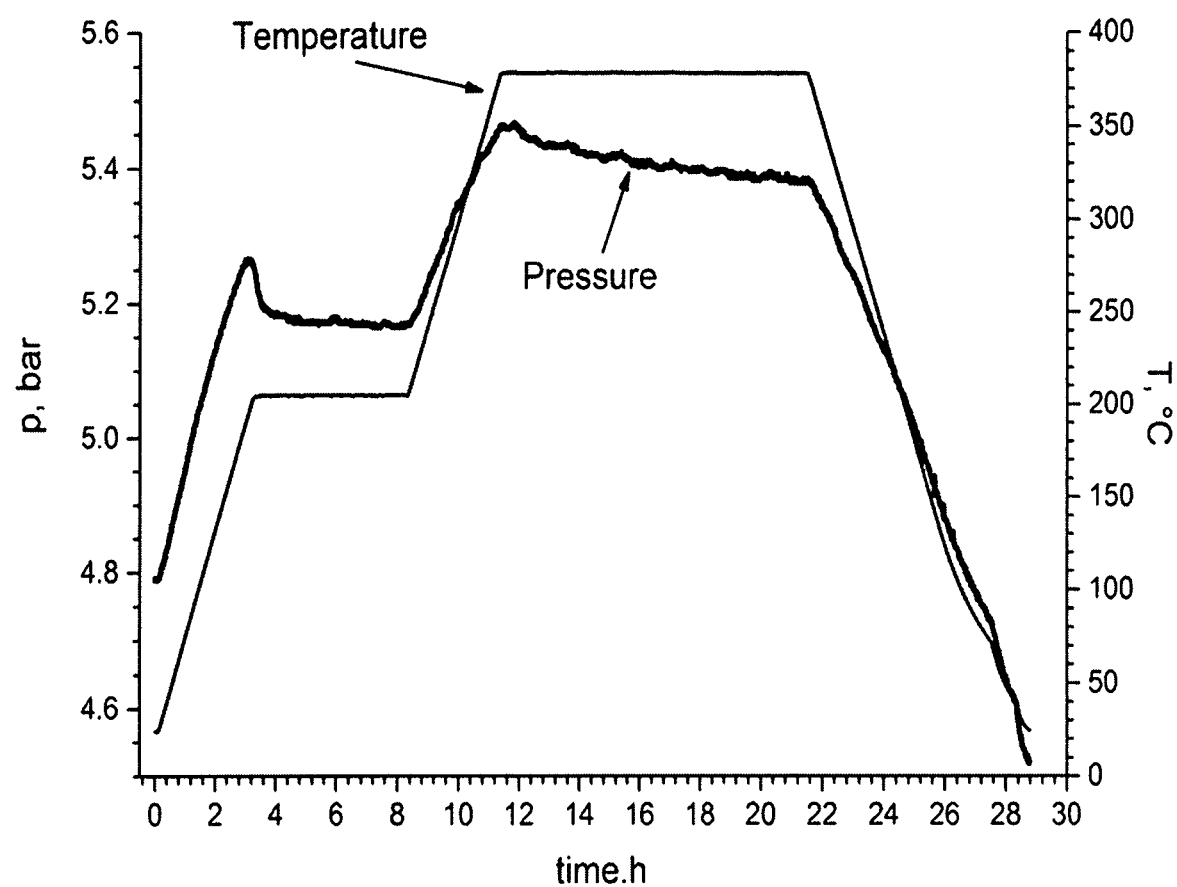
FIG. 3 shows hydrogen absorption kinetics of $LaFe_{13-z}Si_{z-y}X_y$, where $X=In$, $z=1.2$ and $y=0.1$, i.e., $LaFe_{11.8}Si_{1.1}In_{0.1}$ sample during the third activation cycle.

Third Activation (FIG. 3):

At room temperature the same sample then was pressurized to about 5 bar hydrogen pressure. When kinetic measurement was started, the sample was heated to 200° C. at a rate 1° C./min.

The temperature of 200° C. was kept for 5 hours.

After this temperature of the sample was increased to 370° C. with a rate of 1° C./min and kept at this temperature for 10 hours Then the sample was cooled down to room temperature in a cooling rate of 1° C./min.

After this the sample was evacuated at room temperature.

Keeping the sample under vacuum the autoclave was heated from room temperature to 360° C., kept at this temperature for 2 hours and cooled to room temperature.

Figure 4:
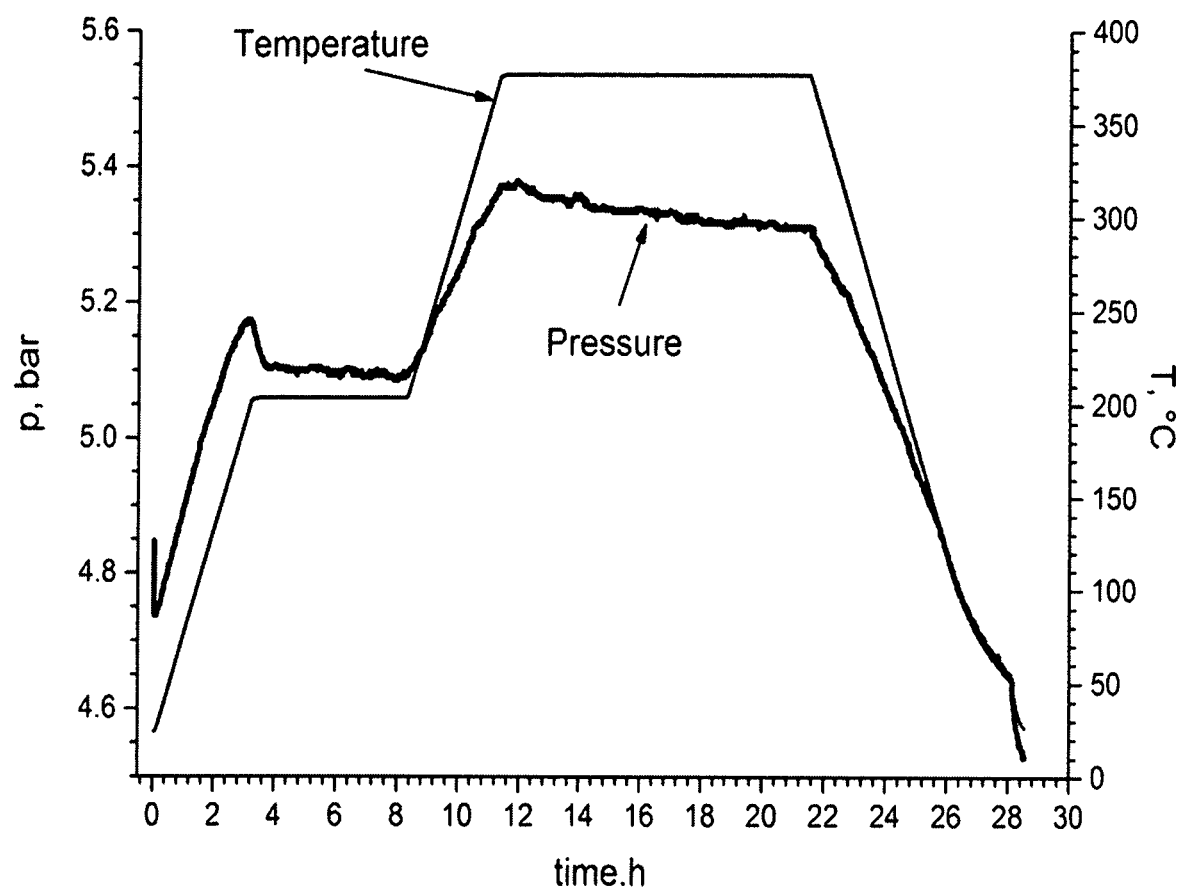
FIG. 4 shows hydrogen absorption kinetics of $LaFe_{13-z}Si_{z-y}X_y$, where $X=In$, $z=1.2$ and $y=0.1$, i.e., $LaFe_{11.8}Si_{1.1}In_{0.1}$ sample during the fourth activation.

Fourth Activation (FIG. 4):

At room temperature the same sample then was pressurized to about 5 bar hydrogen pressure. When kinetic measurement was started, the sample was heated to 200° C. at a rate 1° C./min.

The temperature of 200° C. was kept for 5 hours.

After this temperature of the sample was increased to 370° C. with a rate of 1° C./min and kept at this temperature for 10 hours Then the sample was cooled down to room temperature in a cooling rate of 1° C./min.

After this the sample was evacuated at room temperature.

Keeping the sample under vacuum the autoclave was heated from room temperature to 360° C., kept at this temperature for 2 hours and cooled to room temperature.

Final Hydrogenation and Homogenization of the Same Sample (FIG. 5):

At room temperature the same sample then was pressurized to about 5 bar hydrogen pressure. When kinetic measurement was started, the sample was heated to 200° C. at a rate 1° C./min.

The temperature of 200° C. was kept for 5 hours.

After this temperature of the sample was increased to 370° C. in a rate of 1° C./min and kept at this temperature for 10 hours.

Then the sample was cooled down to 100° C. with a cooling rate of 1° C./min and held at this temperature for 12 hours. This step ensures homogenous distribution of hydrogen in the sample.

After the homogenization the sample was cooled down to room temperature with a cooling rate of 1° C./min.

Figure 5:
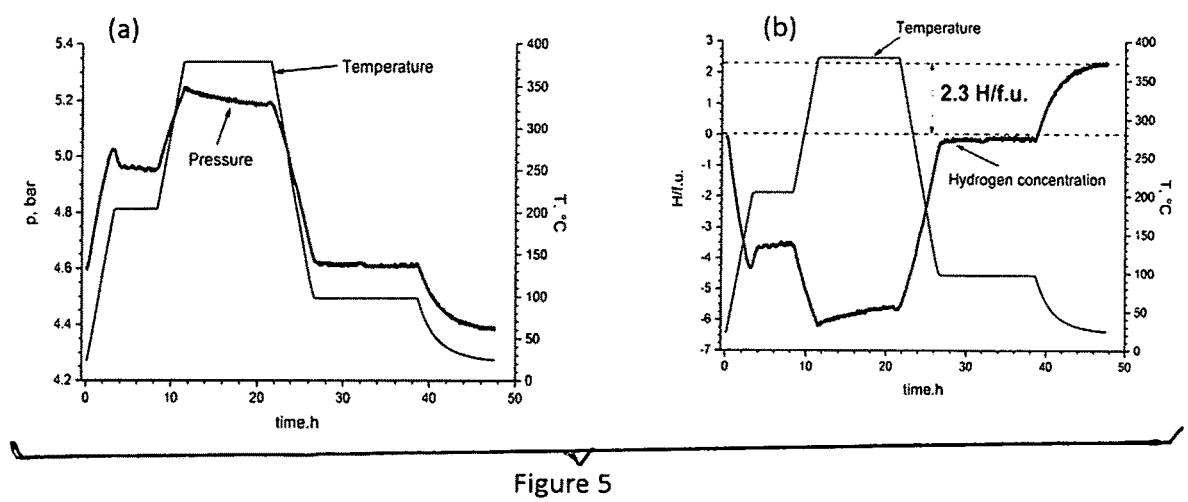
FIG. 5 shows hydrogen absorption kinetics of $LaFe_{13-z}Si_{z-y}X_y$, where $X=In$, $z=1.2$ and $y=0.1$, i.e., $LaFe_{11.8}Si_{1.1}In_{0.1}$ sample during the final hydrogenation-homogenization step a) pressure change; b) hydrogen content change. The negative values in (b) are meaningless and unphysical.

According to data presented in FIG. 5, part b, the activated sample shows total absorption of about 2.3H/f.u. after the above multiple activations.

After this, the sample was evacuated at room temperature and removed from the autoclave for further analysis.

Figure 6:
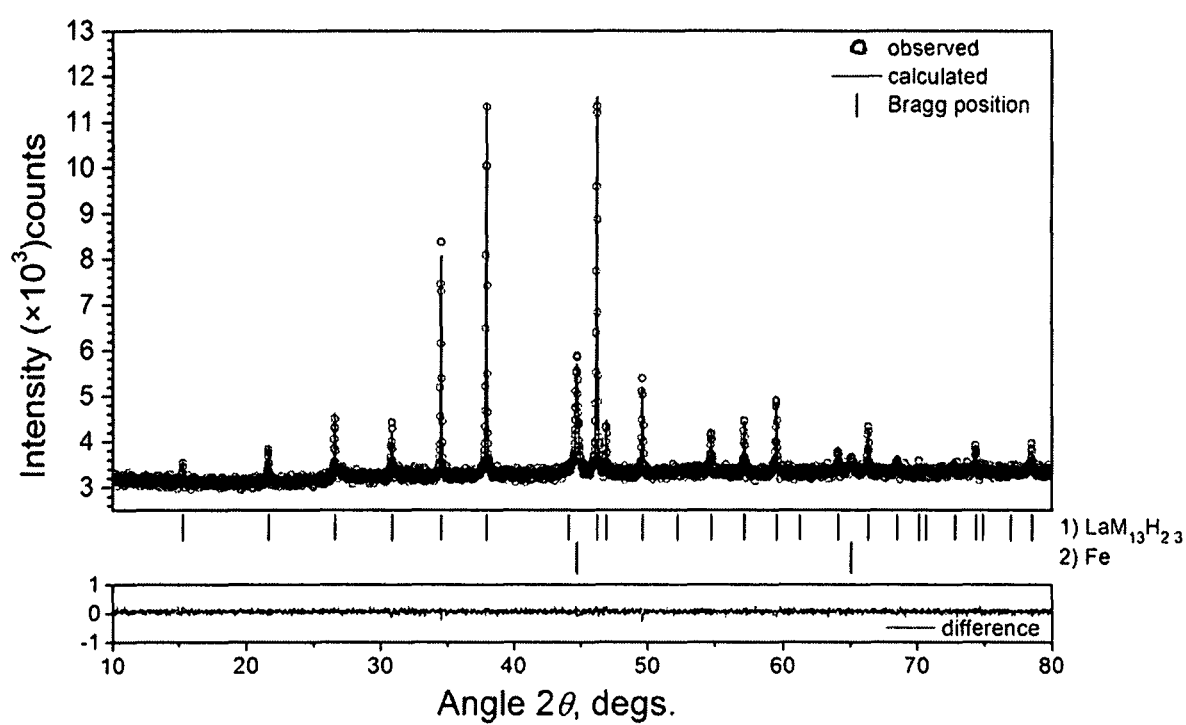
FIG. 6 shows Rietveld refinement of XRD pattern of the fully hydrogenated $LaFe_{13-z}Si_{z-y}X_yH_v$, where $X=In$, $y=0.1$ and $v=2.3$, i.e., $LaFe_{11.8}Si_{1.1}In_{0.1}H_{2.3}$ sample. Vertical bars underneath the main panel mark calculated positions of Bragg peaks of the phases present in the sample: $LaFe_{11.8}Si_{1.1}In_{0.1}H_{2.3}$ (labeled as $LaM_{13}H_{2.3}$) and Fe. The bottom panel shows the difference between the observed and calculated intensities.

Interstitial hydrides so made are represented by:

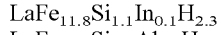
$LaFe_{11.8}Si_{1.1}In_{0.1}H_{2.3}$
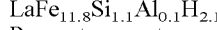
$LaFe_{11.8}Si_{1.1}Al_{0.1}H_{2.1}$ Room temperature x-ray diffraction, FIG. 6, confirmed that the $NaZn_{13}$ crystal structure is preserved after the hydrogenation, and the material still contains about 10-20% by volume of α-iron as an impurity phase. The presence of α-iron does not deteriorate the value of the magnetic entropy change, yet the hydride also demonstrates much improved mechanical stability. The unit cell dimension, a, as expected, increases as the result of hydrogen being inserted into the lattice as summarized in the Table below. Insertion of hydrogen does not change the coordinates of atoms in a statistically significant way, as also shown in the table below, thus the crystal structure of the hydride remains the same but with additional interstitial atoms of hydrogen present. In both examples shown here, the amount of hydrogen absorbed is higher compared to that reported (1.58H/f.u.) in similar systems [reference 11].

TABLE 1

Crystallographic data of $LaFe_{11.8}Si_{1.1}In_{0.1}H_{2.3}$ (before hydrogenation) and $LaFe_{11.8}Si_{1.1}In_{0.1}H_{2.3}$ (after hydrogenation) obtained as a result of Rietveld refinement. Space group Fm-3c. La occupies the 8a (1/4, 1/4, 1/4) position, Fe1 occupies the 8b position (0, 0, 0), and a mixture of $(Fe_{0.8}Si_{1.1}In_{0.1})$ occupies the 96i position (0, y/b, z/c). Only y and z coordinates of this position are listed in the table with the numbers in parentheses representing estimated errors in the last significant digit

| Material | a (Å) | Coordinates of $(Fe_{10.8}Si_{1.1}In_{0.1})$ in the unit cell | |
|---|---|---|---|
| | | y/b | z/c |
| $LaFe_{11.8}Si_{1.1}In_{0.1}$ | 11.4754 (3), | 0.1170 (2) | 0.1793 (2) |
| $LaFe_{11.8}Si_{1.1}In_{0.1}H_{2.3}$ | 11.6210 (4) | 0.1152 (2) | 0.1783 (2) |

Example 3

Curie Temperatures

Isofield magnetization (M) measurements were carried out on samples of Example 1 in a Quantum Design Physical Property Measurement System (QD-PPMS) with a vibrating sample magnetometer insert.

Figure 7:
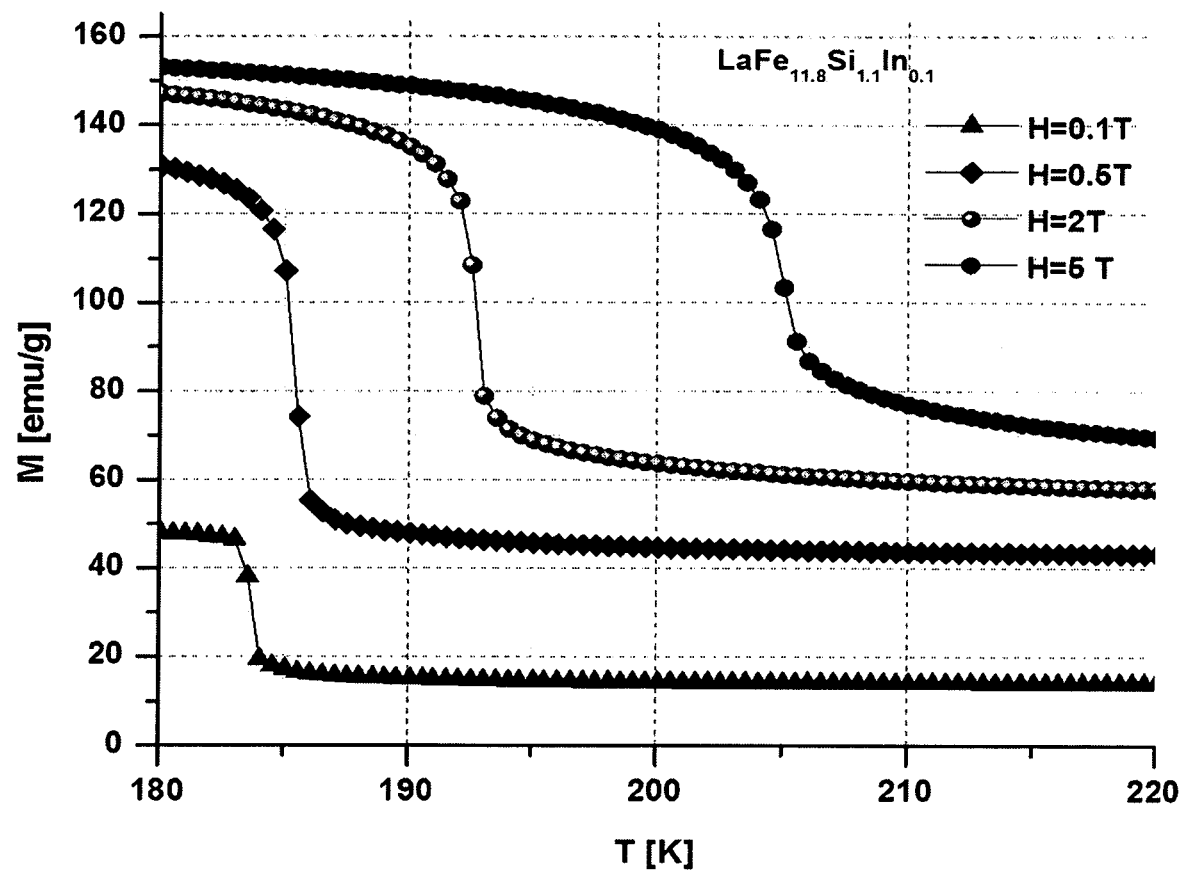
FIG. 7 shows magnetization as a function of temperature for drop cast and heat treated $LaFe_{13-z}Si_{z-y}X_y$, where $X=In$, $z=1.2$ and $y=0.1$, i.e., $LaFe_{11.8}Si_{1.1}In_{0.1}$ sample in magnetic fields up to 5 Tesla.

The Curie temperature, $T_C$, of the $LaFe_{11.8}Si_{1.1}In_{0.1}$ sample was determined from magnetization vs temperature data, M(T), measured in several constant magnetic field shown in FIG. 7. $T_C$ is 184K while heating in H=0.1 Tesla. On cooling in 0.1 Tesla field, the transition occurs at $T_C$=181K (not shown in FIG. 7) resulting in thermal hysteresis of 3K.

Figure 8:
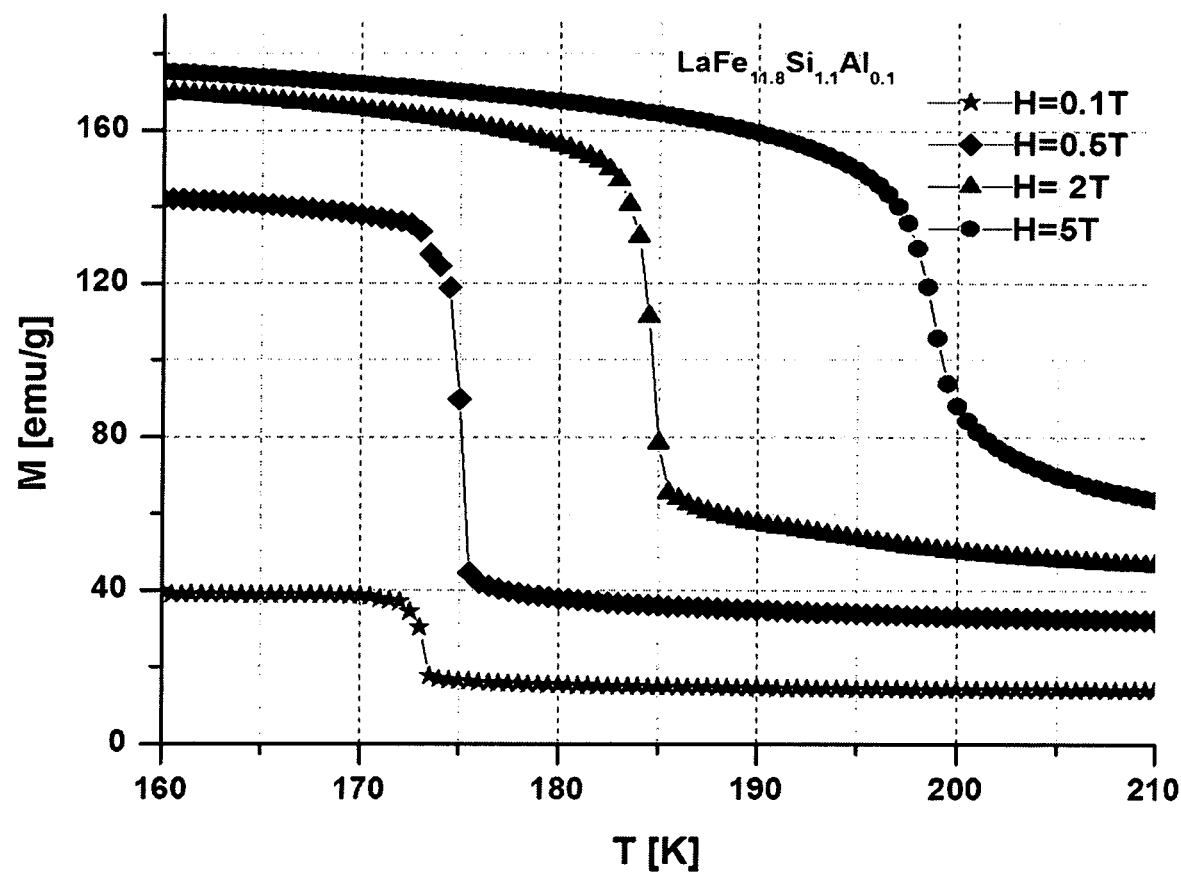
FIG. 8 shows magnetization as a function of temperature for drop cast and heat treated $LaFe_{13-z}Si_{z-y}X_y$, where $X=Al$, $z=1.2$ and $y=0.1$, i.e., $LaFe_{11.8}Si_{1.1}Al_{0.1}$ sample with in magnetic fields up to 5 Tesla.

Similarly, the Curie temperature, $T_C$, of the $LaFe_{11.8}Si_{1.1}Al_{0.1}$ sample was determined to be 173K while heating, see FIG. 8 and 168K while cooling (not shown in FIG. 8) at H=0.1Tesla.

Figure 9:
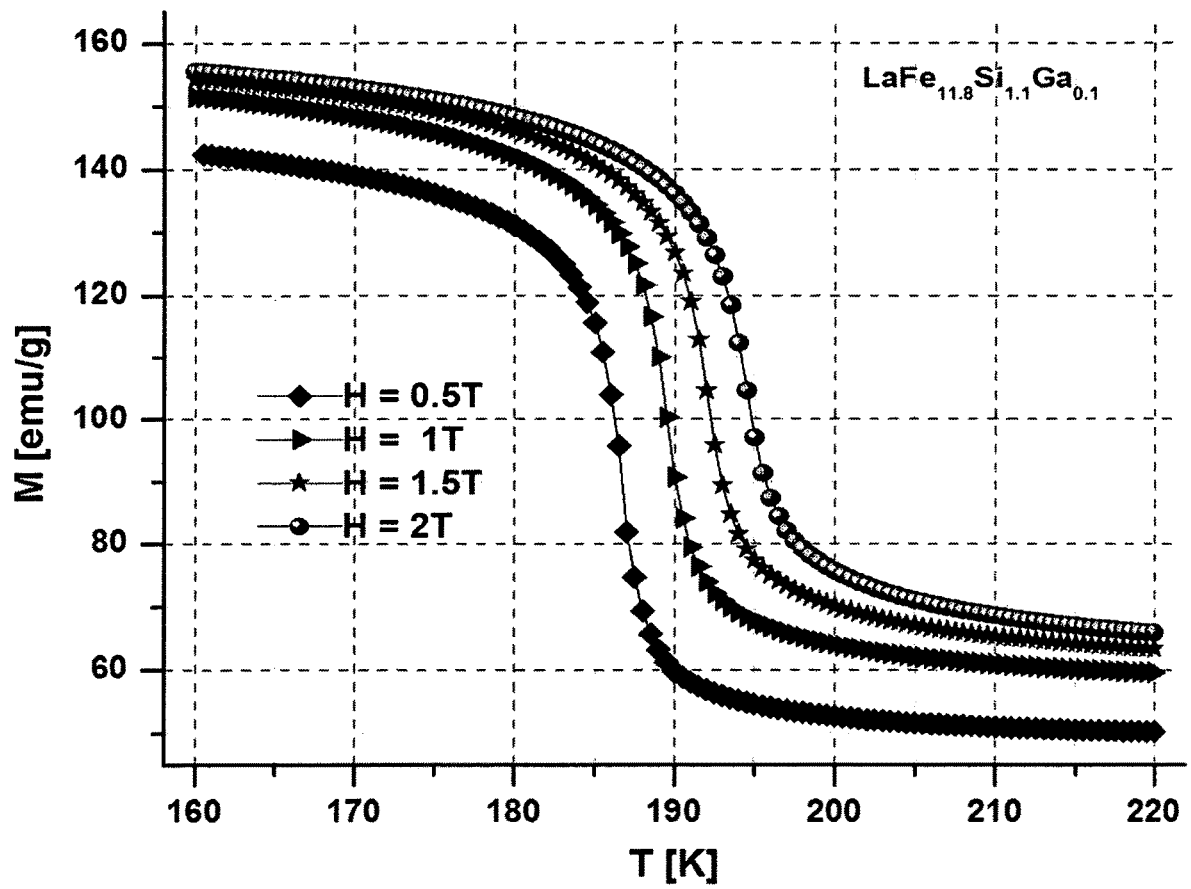
FIG. 9 shows magnetization as a function of temperature for drop cast and heat treated $LaFe_{13-z}Si_{z-y}X_y$, where $X=Ga$, $z=1.2$ and $y=0.1$, i.e., $LaFe_{11.8}Si_{1.1}Ga_{0.1}$ sample in magnetic fields up to 2 Tesla.

Similarly, the Curie temperature, $T_C$, of the $LaFe_{11.8}Si_{1.1}Ga_{0.1}$ sample was determined to be 187K while heating, see FIG. 9 at H=0.5Tesla.

Figure 10:
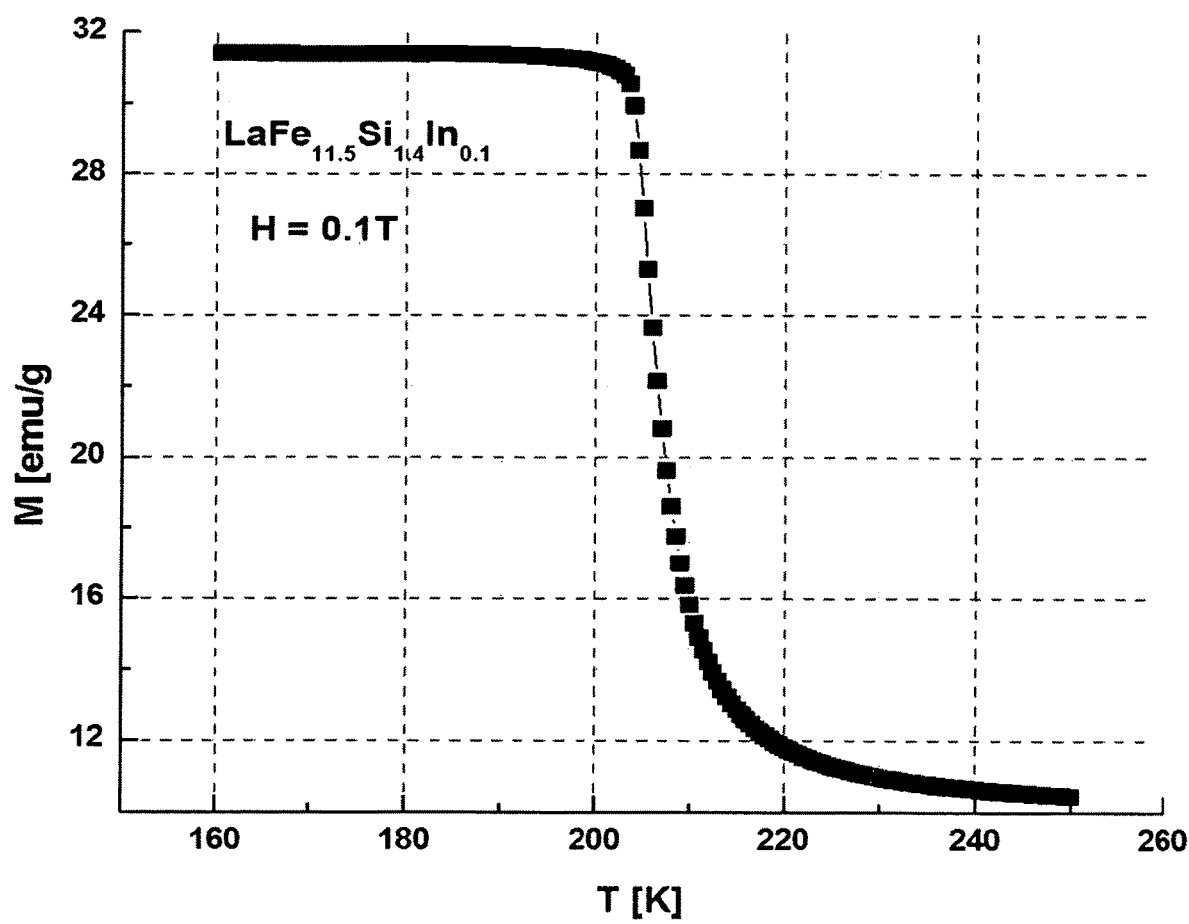
FIG. 10 shows magnetization as a function of temperature for drop cast and heat treated $LaFe_{13-z}Si_{z-y}X_y$, where $X=In$, $z=1.5$ and $y=0.1$, i.e., $LaFe_{11.5}Si_{1.4}In_{0.1}$ sample in a magnetic field of 0.1 Tesla.

Similarly, the Curie temperature, $T_C$, of the $LaFe_{11.5}Si_{1.4}In_{0.1}$ sample was determined to be 207 K while heating, see FIG. 10 at H=0.1Tesla.

Figure 11:
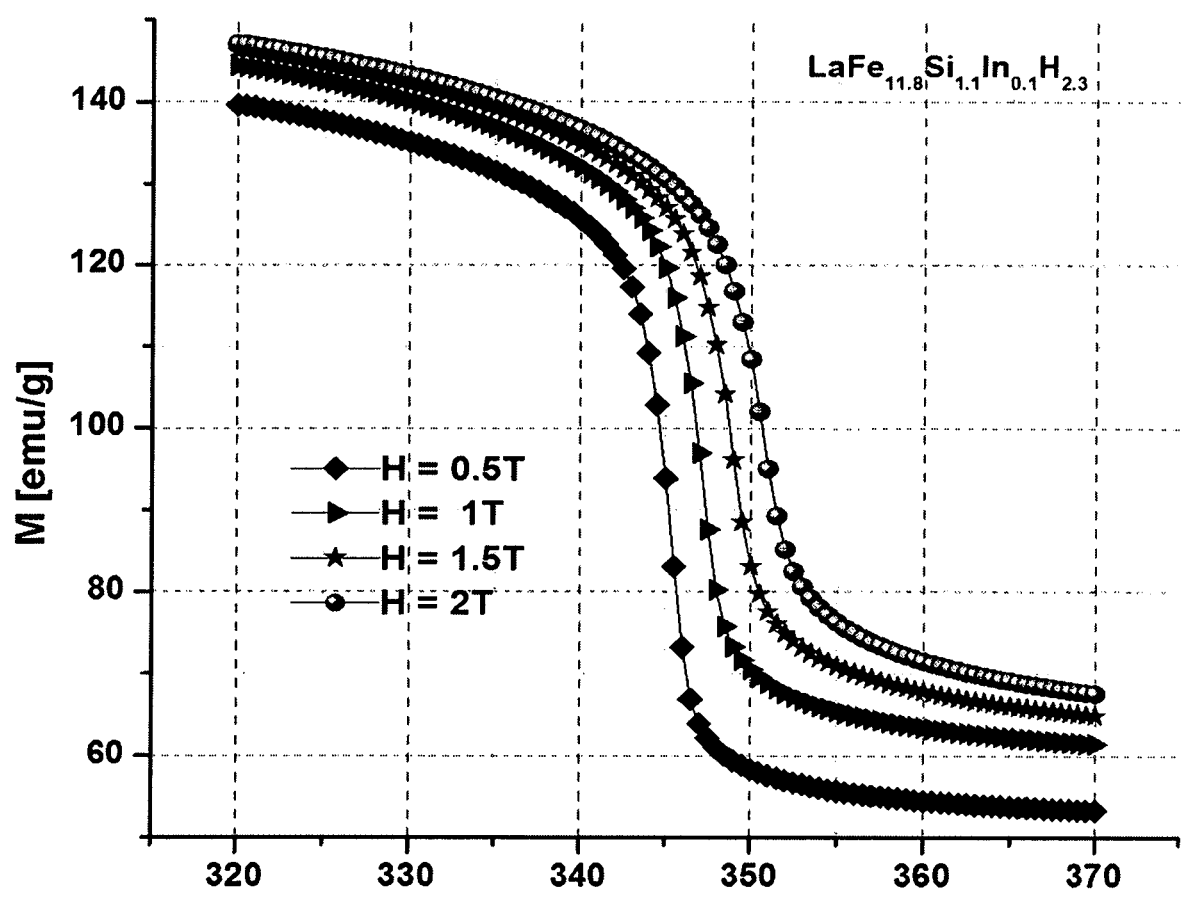
FIG. 11 shows magnetization as a function of temperature for drop cast, heat treated, and then hydrogenated $LaFe_{13-z}Si_{z-y}X_yH_v$, where $X=In$, $z=1.2$, $y=0.1$ and $v=2.3$, i.e., $LaFe_{11.8}Si_{1.1}In_{0.1}H_{2.3}$ sample in magnetic fields up to 2 Tesla.

Similarly, the Curie temperature, $T_C$, of the hydrogenated $LaFe_{11.8}Si_{1.1}In_{0.1}H_{2.3}$ sample was determined to be 345 K while heating, see FIG. 11 at H=0.5Tesla.

Figure 12:
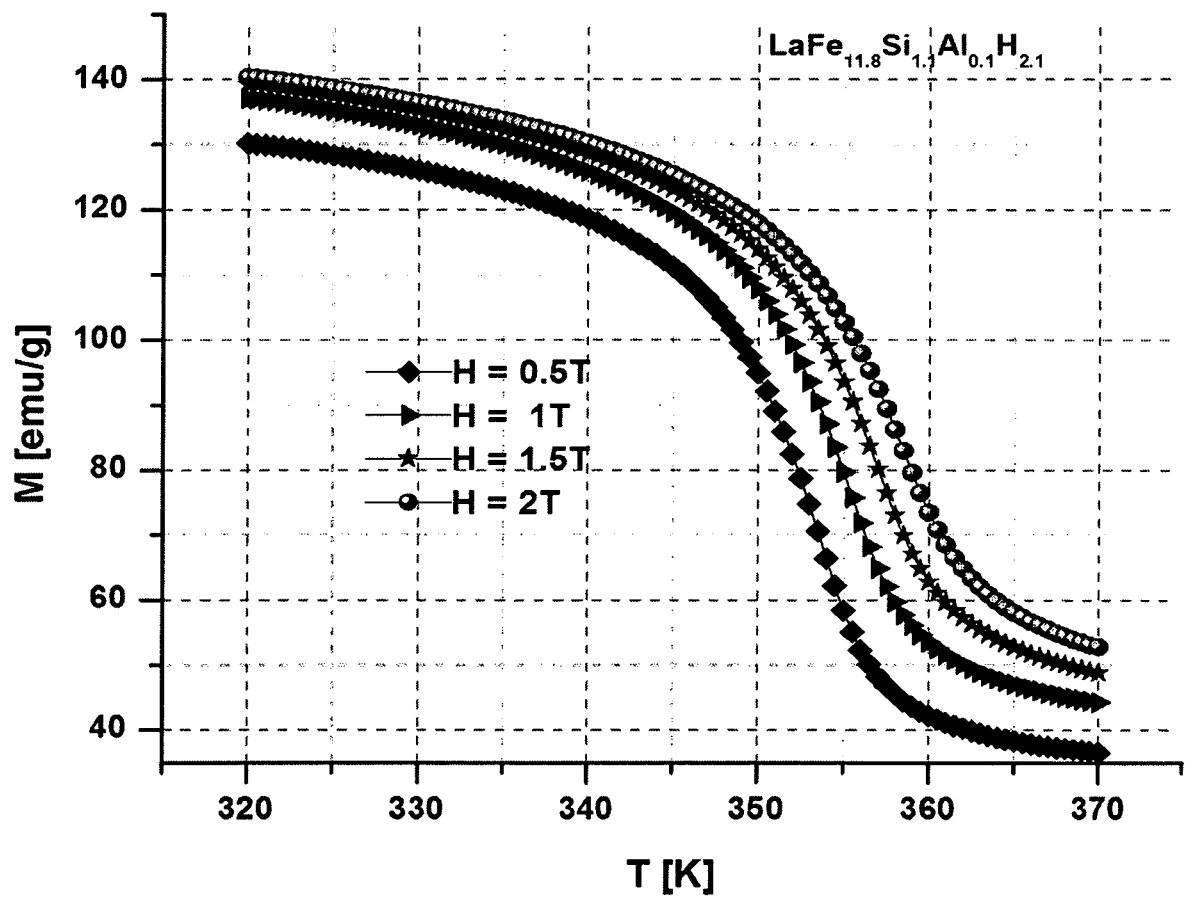
FIG. 12 shows magnetization as a function of temperature for drop cast, heat treated, and then hydrogenated $LaFe_{13-z}Si_{z-y}X_yH_v$, where $X=Al$, $z=1.2$, $y=0.1$ and $v=2.1$, i.e., $LaFe_{11.8}Si_{1.1}Al_{0.1}H_{2.1}$ sample in magnetic fields up to 2 Tesla.

Similarly, the Curie temperature, $T_C$, of the hydrogenated $LaFe_{11.8}Si_{1.1}Al_{0.1}H_{2.1}$ sample was determined to be 355 K while heating, see FIG. 12 at H=0.5Tesla.

In all of these samples, the shift of the Curie temperature with magnetic field is greater than 4K/Tesla, FIGS. 1, 2, 3, 4 and 5.

Example 4

Magnetocaloric Effect (Magnetic Entropy Change, $\Delta S_M$)

All materials described in Examples 1, 2, and 3 exhibit strong metamagnetic transitions in isothermal M(H) measurements. The calculations of the magnetic entropy change, $\Delta S_M$, were performed employing Maxwell equation using isofield magnetization measurements carried with 1 K·min$^{-1}$ temperature sweeps. Isofield magnetization, M(T), measurements were performed in a Quantum Design Physical Property Measurement System (QD-PPMS) with a vibrating sample magnetometer.

Figure 13:
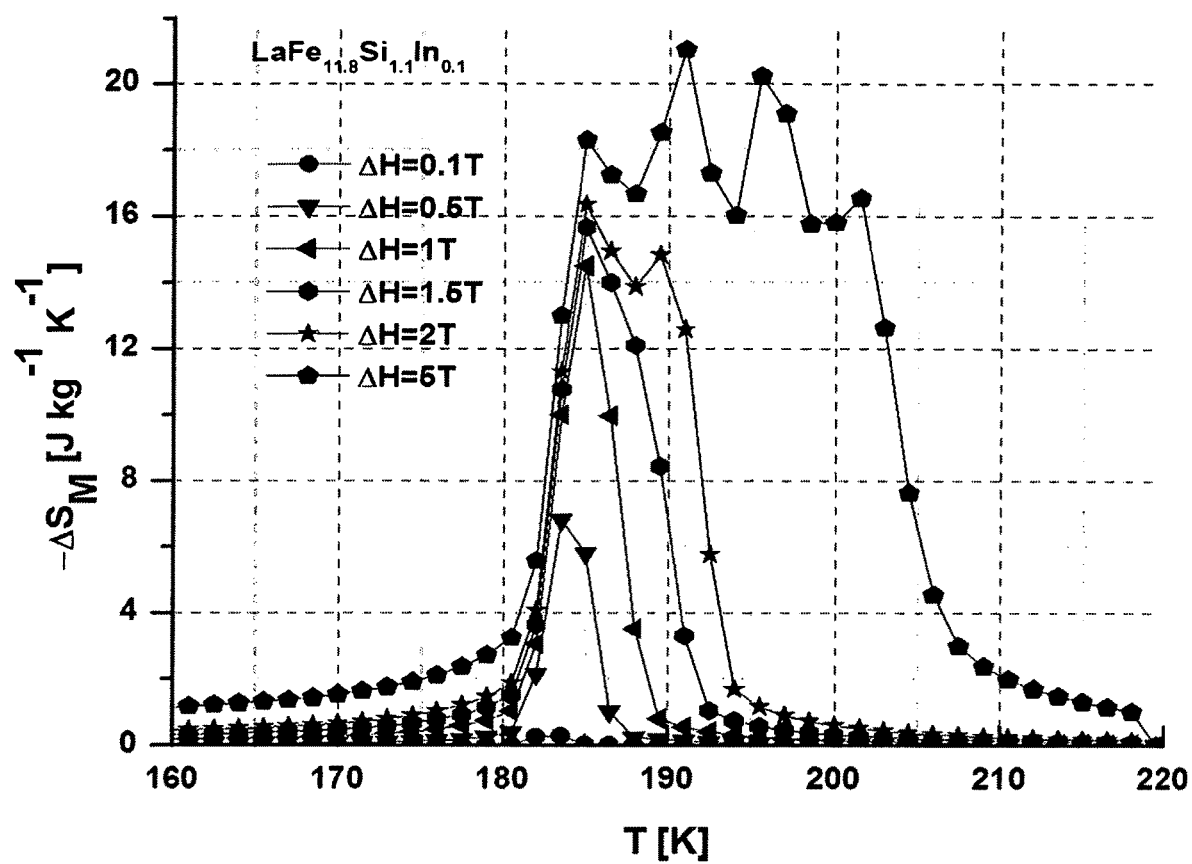
FIG. 13 shows entropy change, $\Delta S_M$, as a function of temperature for drop cast and heat treated $LaFe_{13-z}Si_{z-y}X_y$, where $X=In$, $z=1.2$ and $y=0.1$, i.e., $LaFe_{11.8}Si_{1.1}In_{0.1}$ sample in magnetic fields up to 5 Tesla.
Figure 14:
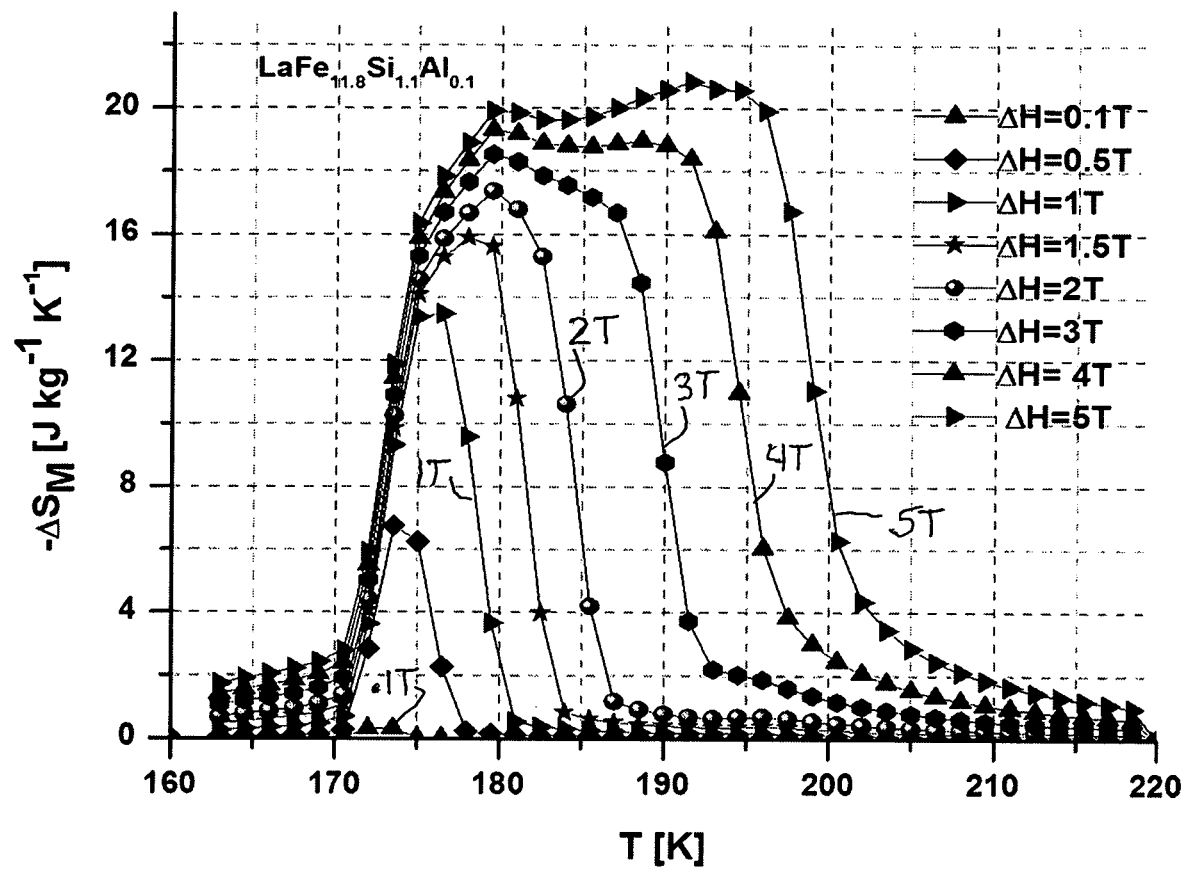
FIG. 14 shows entropy change, $\Delta S_M$, as a function of temperature for drop cast and heat treated $LaFe_{13-z}Si_{z-y}X_y$, where $X=Al$, $z=1.2$ and $y=0.1$, i.e., $LaFe_{11.8}Si_{1.1}Al_{0.1}$ sample in magnetic fields up to 5 Tesla.
Figure 15:
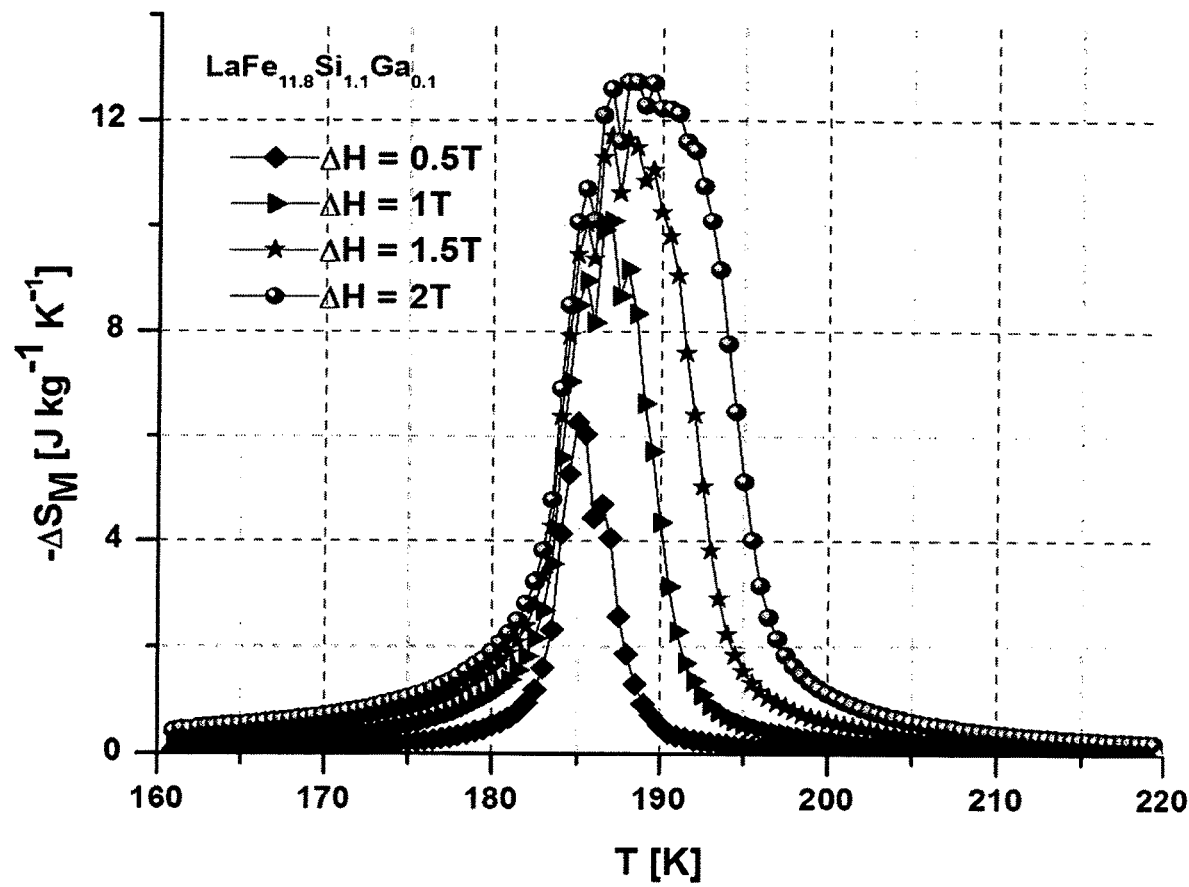
FIG. 15 shows entropy change, $\Delta S_M$, as a function of temperature for drop cast and heat treated $LaFe_{13-z}Si_{z-y}X_y$, where $X=Ga$, $z=1.2$ and $y=0.1$, i.e., $LaFe_{11.8}Si_{1.1}Ga_{0.1}$ sample in magnetic fields up to 2 Tesla.
Figure 16:
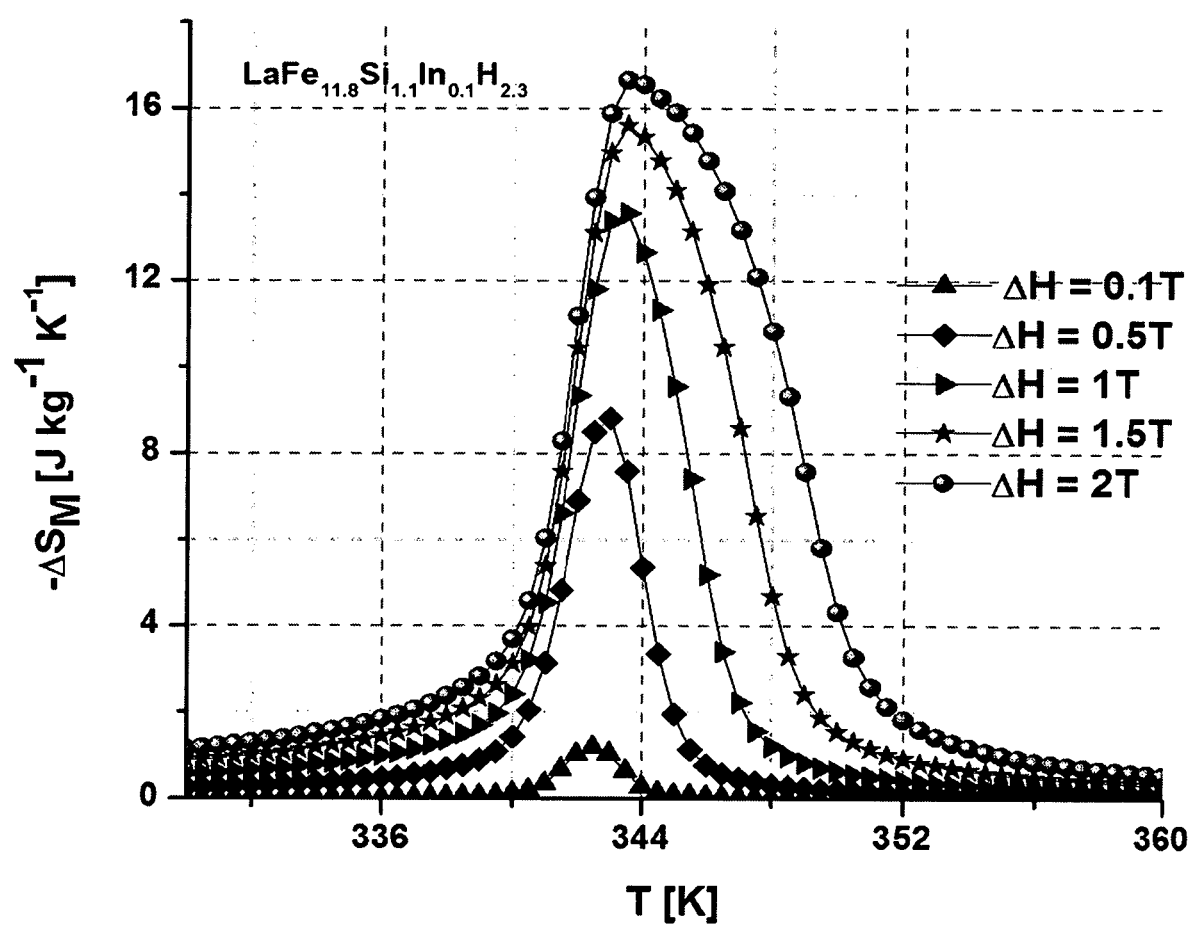
FIG. 16 shows entropy change, $\Delta S_M$, as a function of temperature for drop cast, heat treated, and then hydrogenated $LaFe_{13-z}Si_{z-y}X_yH_v$, where $X=In$, $z=1.2$, $y=0.1$ and $v=2.3$, i.e., $LaFe_{11.8}Si_{1.1}In_{0.1}H_{2.3}$ sample in magnetic fields up to 2 Tesla.
Figure 17:
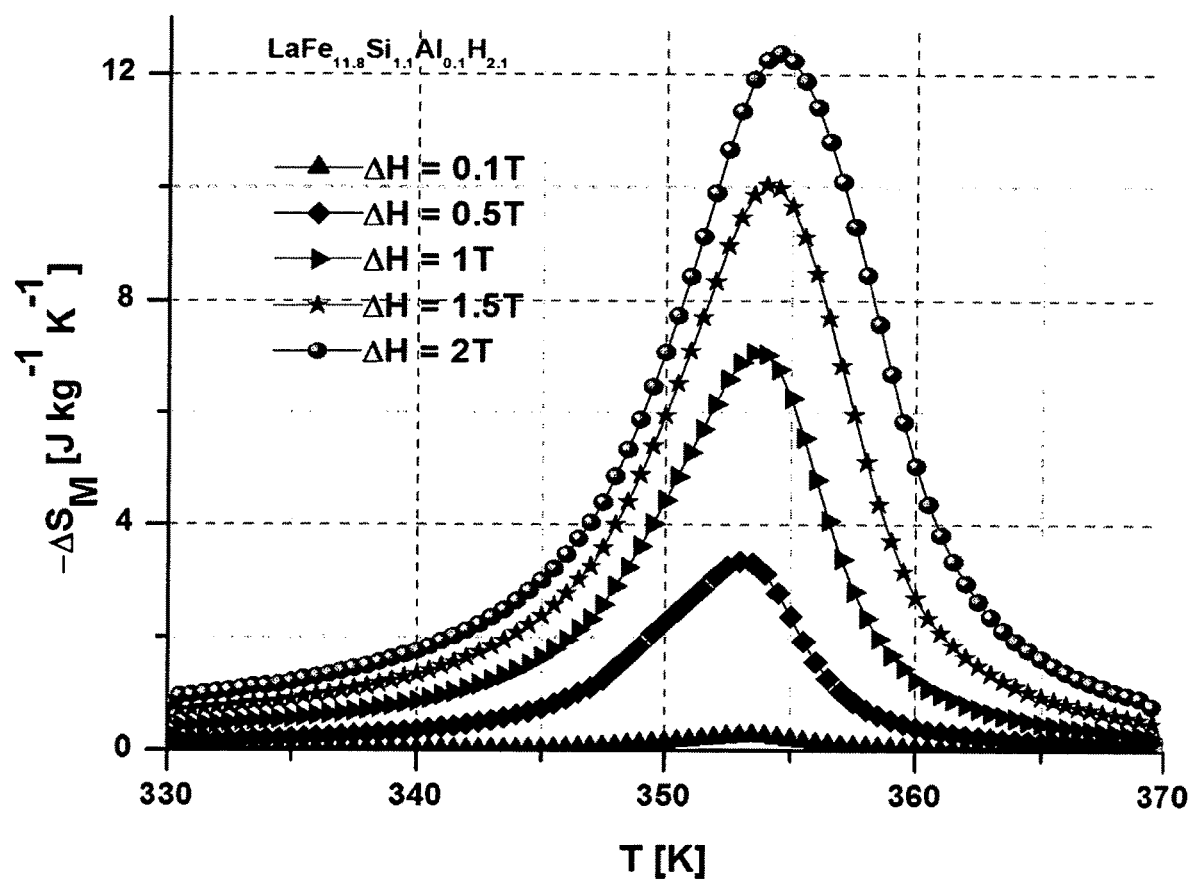
FIG. 17 shows entropy change, $\Delta S_M$, as a function of temperature for drop cast, heat treated, and then hydrogenated $LaFe_{13-z}Si_{z-y}X_yH_v$, where $X=Al$, $z=1.2$, $y=0.1$ and $v=2.1$, i.e., $LaFe_{11.8}Si_{1.1}Al_{0.1}H_{2.1}$ sample in magnetic fields up to 2 Tesla.

The corresponding values of the magnetic entropy change for $LaFe_{11.8}Si_{1.1}In_{0.1}$ are shown in FIG. 13; for $LaFe_{11.8}Si_{1.1}Al_{0.1}$ are shown in FIG. 14; for $LaFe_{11.8}Si_{1.1}Ga_{0.1}$ are shown in FIG. 15; for $LaFe_{11.8}Si_{1.1}In_{0.1}H_{2.3}$ are shown in FIG. 16; and for $LaFe_{11.8}Si_{1.1}Al_{0.1}H_{2.1}$ are shown in FIG. 17. All materials of Example 1 demonstrate similar or even higher $\Delta S_M$ when compared to the parent materials without adding Al, Ga, and/or In.

Example 5

Rapidly Solidified Materials

Figure 18:
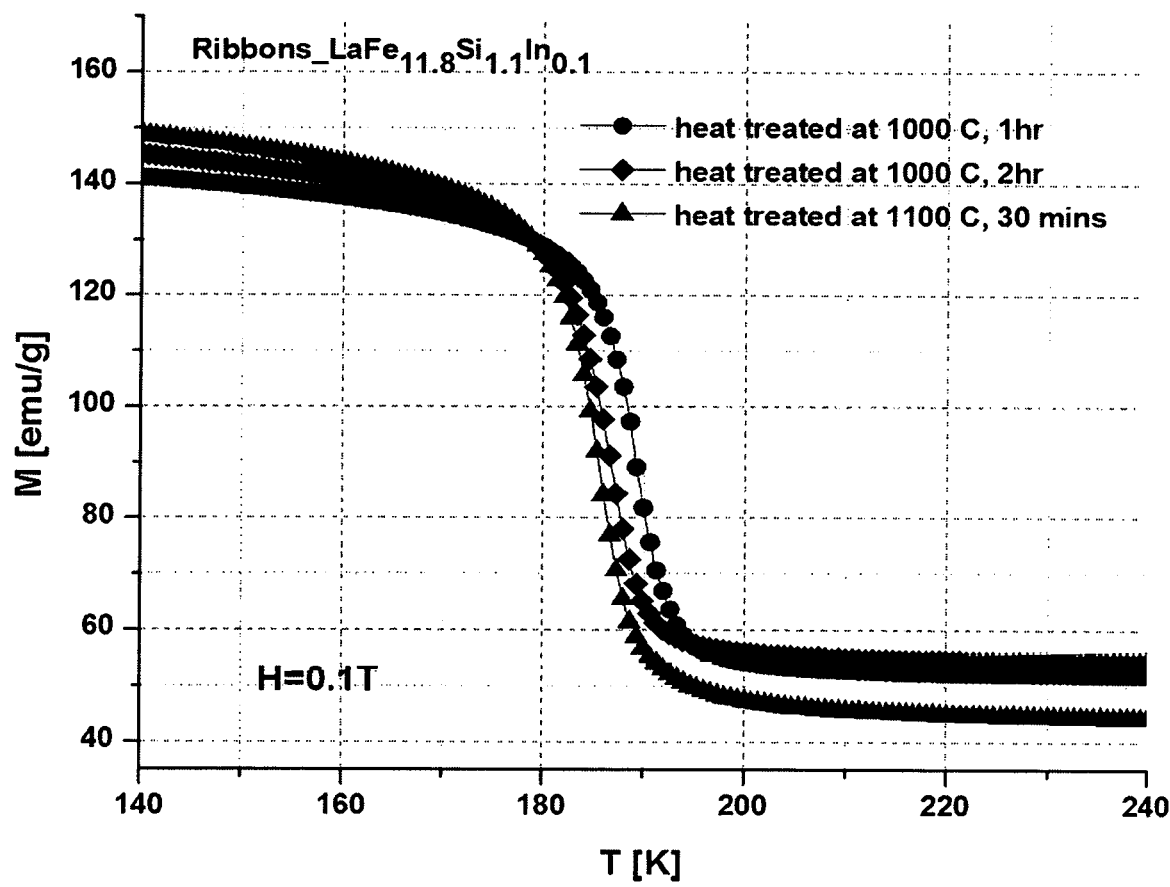
FIG. 18 shows magnetization as a function of temperature for melt spun ribbons of $LaFe_{13-z}Si_{z-y}X_y$, where $X=In$, $z=1.2$ and $y=0.1$, i.e., $LaFe_{11.8}Si_{1.1}In_{0.1}$ measured in 0.1 Tesla magnetic field after different heat treatments as marked.
Figure 19:
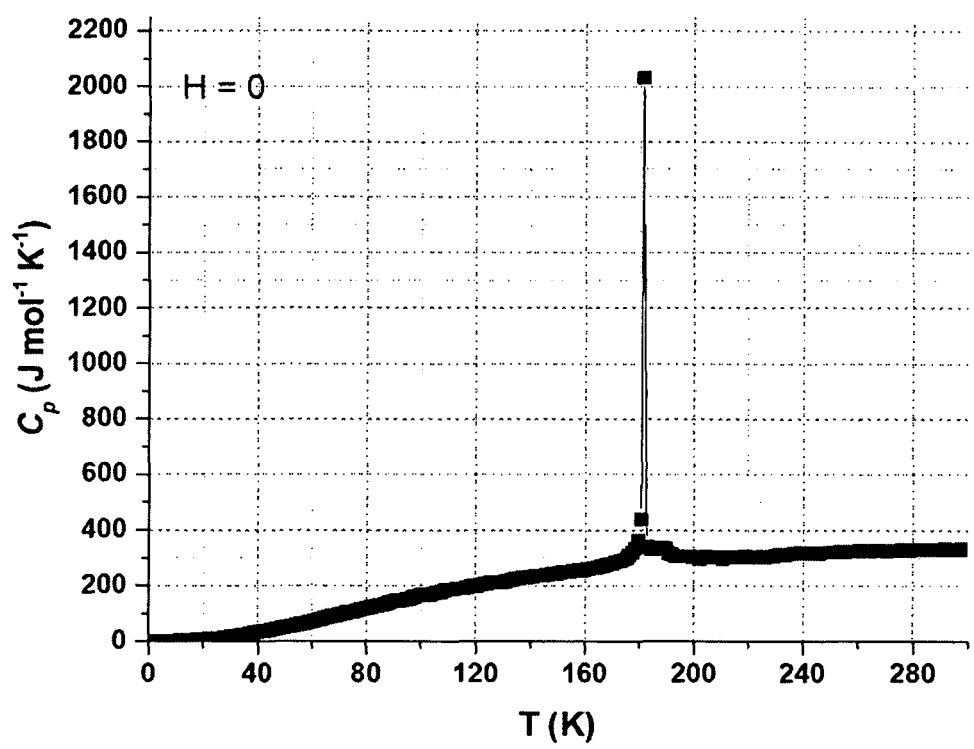
FIG. 19 shows heat capacity, Cp, of drop cast and heat treated $LaFe_{11.8}Si_{1.1}In_{0.1}$ measured as a function of temperature in zero magnetic field, $H=0$.
Figure 20:
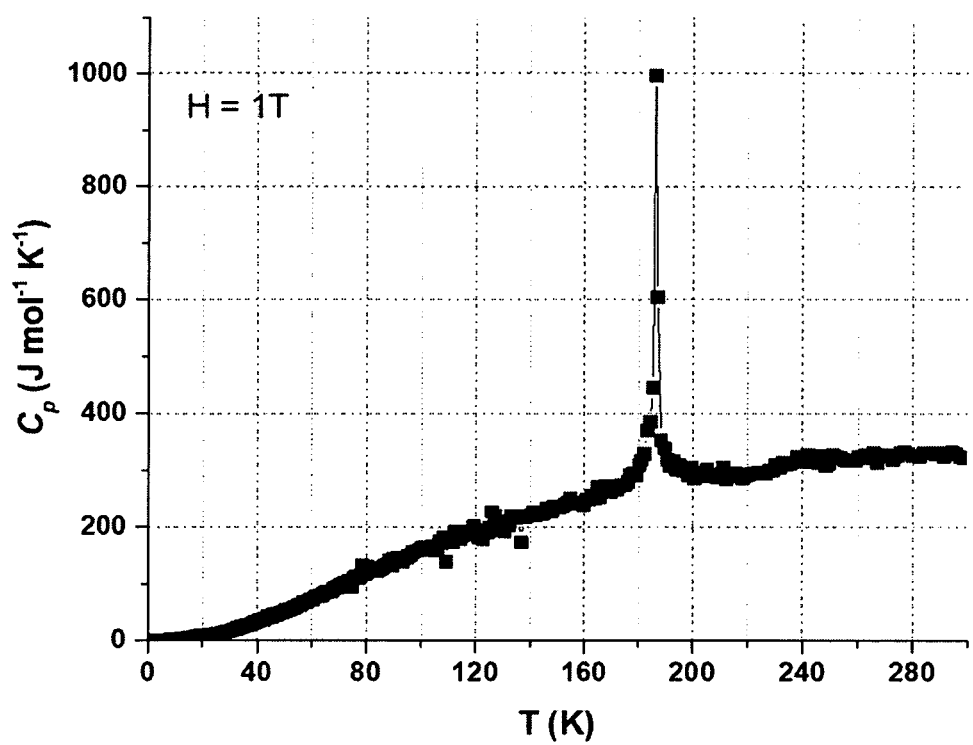
FIG. 20 shows heat capacity, Cp, of drop cast and heat treated $LaFe_{11.8}Si_{1.1}In_{0.1}$ measured as a function of temperature in 1 Tesla magnetic field, $H=1$ T.
Figure 21:
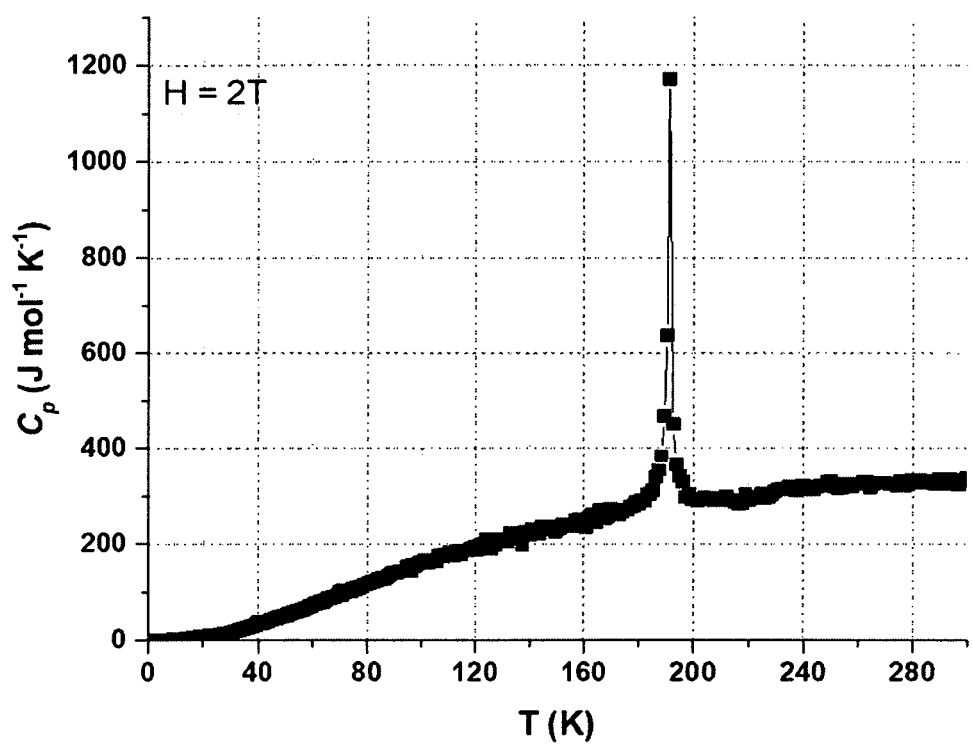
FIG. 21 shows heat capacity, Cp, of drop cast and heat treated $LaFe_{11.8}Si_{1.1}In_{0.1}$ measured as a function of temperature in 2 Tesla magnetic field, $H=2$ T.
Figure 22:
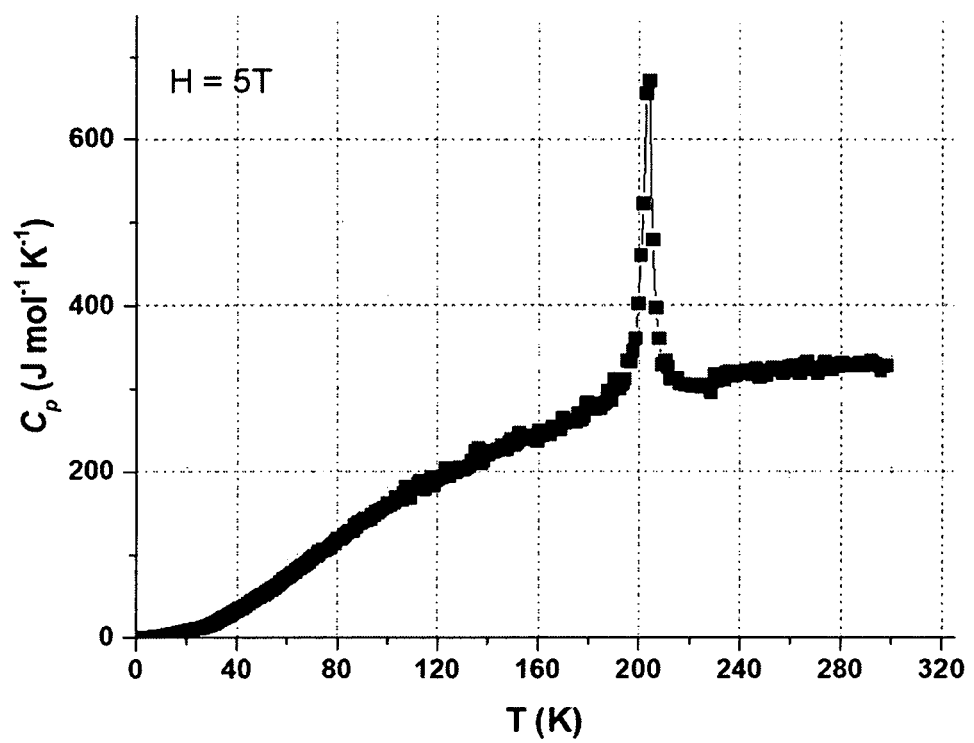
FIG. 22 shows heat capacity, Cp, of drop cast and heat treated $LaFe_{11.8}Si_{1.1}In_{0.1}$ measured as a function of temperature in 5 Tesla magnetic field, $H=5$ T.
Figure 23:
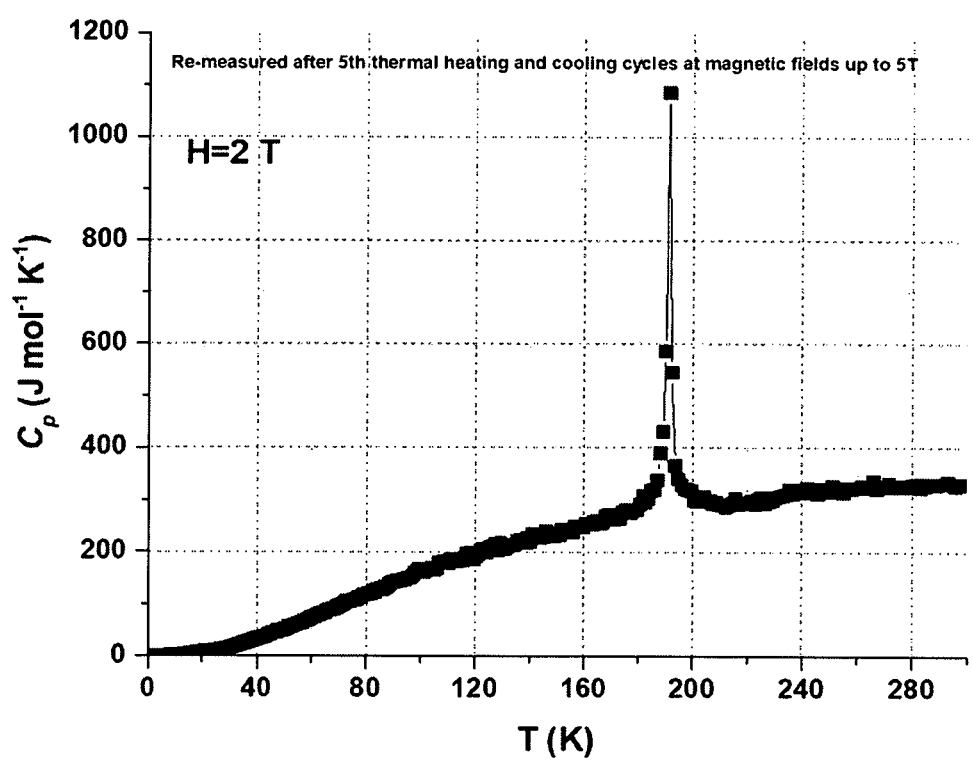
FIG. 23 shows heat capacity, Cp, of drop cast and heat treated $LaFe_{11.8}Si_{1.1}In_{0.1}$ measured as a function of temperature in 2 Tesla magnetic field, $H=2$ T, after the sample went through five heating and cooling cycles in magnetic fields $H=0$, 1, 2, 5, and 2 T.

The rapidly solidified melt-spun ribbons were prepared using induction melting of drop-cast $La(FeSiX)_{13}$ alloys (where X is at least one of Al, Ga, and In as indicated above) in a quartz crucible at ⅓ atmosphere of high purity He gas and then ejected at 0.1 atmosphere overpressure of helium at the melt temperature of 1570 K onto a copper chill wheel rotating at a tangential speed of about 25 m/s. The rapidly solidified ribbons then were optionally heat-treated in order to crystallize possible remains of amorphous material and/or release internal stress after the rapid quenching. Moreover, annealing of the ribbons at different temperatures allows control of the transition temperature and thus operation temperature of magnetic refrigeration material. FIG. 18 shows magnetization as a function of temperature for $LaFe_{11.8}Si_{1.1}In_{0.1}$ measured in magnetic field 0.1 Tesla. The $T_C$ of melt spun ribbons of $LaFe_{11.8}Si_{1.1}In_{0.1}$ is ~10 K higher compare to same composition of drop cast alloy.

Example 6

Heat Capacity and Thermal Conductivity of Drop-Cast/Heat-Treated Materials

Figure 24:
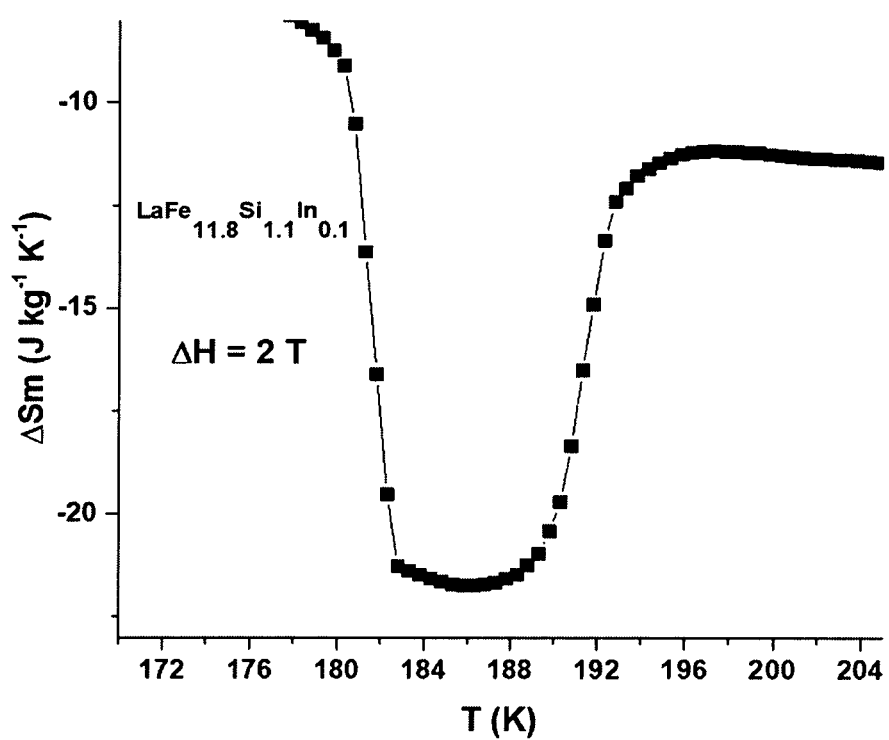
FIG. 24 shows the magnetic entropy change, $\Delta S_m$, as a function of temperature calculated from heat capacity data of drop cast and heat treated $LaFe_{11.8}Si_{1.1}In_{0.1}$ measured in magnetic fields of 0 and 2 Tesla, i.e. for magnetic field change, $\Delta H=2$ T.

The heat capacity of drop cast and heat treated $LaFe_{11.8}Si_{1.1}In_{0.1}$ sample of Example 1 was measured in magnetic fields up to 5 Tesla (FIGS. 19 to 23). The magnetic entropy and maximum adiabatic temperature changes were calculated from the heat capacity data, and the magnetic entropy change, $\Delta S_m$, for magnetic field change from 0 to 2 Tesla, i.e., for $\Delta H=2$ Tesla is shown in FIG. 24. Unlike in earlier known, unsubstituted materials (Lyubina et al., Adv. Mater. 22, 3735, 2010) the indium-substituted alloy composition or compound, as well as other compositions described in this invention, show reversible magnetocaloric effect (both $\Delta S_m$ and the maximum adiabatic temperature change, $\Delta T_{max}$) even after undergoing numerous temperature-field cycles; the materials do not crack or decrepitate, indicating good mechanical stability. For example Lyubina et al., Adv. Mater. 22, 3735, (2010) reported that $\Delta T_{max}$ of bulk $LaFe_{11.6}Si_{1.4}$ alloy decreases with every cycle, starting from ~7.3 K at $\Delta H=2$ Tesla during the first cycle, and the sample broke during the fourth cycle. In contrast, in this example, the maximum magnetic entropy and adiabatic temperature changes of the drop cast and heat treated sample remained practically identical: $\Delta Sm=21.7$, J kg$^{-1}$ K$^{-1}$ and $\Delta T_{max}=8.2$ K for $\Delta H=2$ T during the first cooling-heating cycle, remaining $\Delta Sm=20.3$ and $\Delta T_{max}=8$ K for $\Delta H=2$ T during the fifth cooling-heating cycle. No cracking was observed after a total of 20 cycles.

Figure 25:
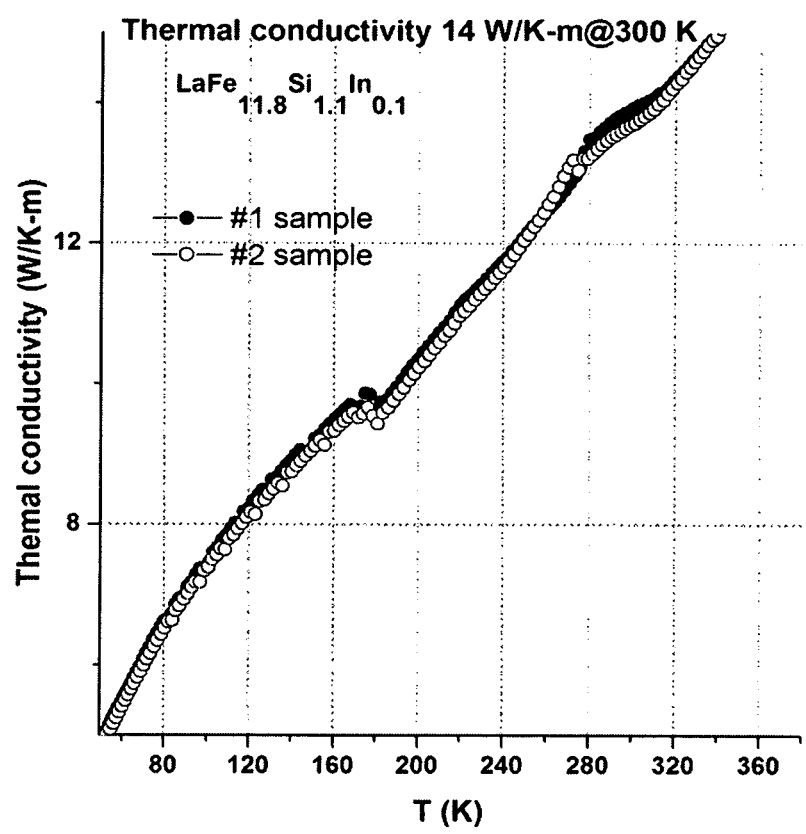
FIG. 25 shows thermal conductivity of drop cast and heat treated $LaFe_{11.8}Si_{1.1}In_{0.1}$ samples measured using two different rectangular bars (#1 and #2) as a function of temperature.

Thermal conductivity of drop cast and heat treated $LaFe_{11.8}Si_{1.1}In_{0.1}$ sample of Example 1 was found to be 14 W/K-m at 300K (FIG. 25), which is significantly higher compared to the reported values for unsubstituted materials (i.e. same alloy without In, Al, and Ga) at the same temperature [~9 W/K-m, Matsumoto et. al. Journal of Physics: Conf. Series 897, 012011 (2017), Fujieda et. al., J. App. Phys. 95, 2429 (2004)].

Alloys pursuant to the present invention thus show much improved inherent mechanical stability, higher thermal conductivity, and preserve equivalent or even higher magnetocaloric effects compared to other known and commercially available La—Fe—Si based magnetocaloric materials. Moreover, the alloys contain no toxic or hazardous elements and do not contain expensive elements. Curie temperature (operating temperature) $T_C$ can be properly tuned to room temperature, with an extremely large magnetocaloric effect (here evaluated as entropy change, ΔS). The expected commercial applications include, but are not limited to, magnetic refrigeration and magnetic heat pumping.

Although the present invention is described above with respect to certain illustrative embodiments, the invention is not limited to these embodiments and changes and modifications can be made therein within the scope of the appended claims.

REFERENCES WHICH ARE INCORPORATED HEREIN BY REFERENCE

1. S. Fujieda, A. Fujita, and K. Fukamichi, *Appl. Phys. Lett.* 81, 1276 (2002).
2. N. H. Dung, Z. Q. Ou, L. Caron, L. Zhang, D. T. Cam Thanh, G. A. de Wijs, R. A. de Groot, K. H. Jurgen Buschow and E. Brück, Adv. Ener. Mat., V-1, 1215 (2011).
3. H. Wada, and Y. Tanabe, Appl. Phys. Lett., 79, 3302 (2001).
4. Y. K. Fang, C. C. Yeh, C. W. Chang, W. C. Chang, M. G. Zhuband W. Li, Scripta Materialia 57 453 (2007).
5. S. Dankov, A. M. Tishin, V. K. Pecharsky, K. A. Gschneidner Jr., Phys. Rev. B, V-57, 3478 (1998).
6. K. A. Gschneidner, V. K. Pecharsky, A. O. Tsokol, Rep. Prog. Physics, V-68, 1479 (2005).
7. V. K. Pecharsky, K. A. Gschneidner Jr, Phys. Rev. Lett., V-78, 4494 (1997).
8. Chen et al, United States Patent: US 2014/0166159 A1
9. Hu et al, United States Patent: U.S. Pat. No. 9,657,971 B2
10. Kogure et al, United States Patent: U.S. Pat. No. 7,186,303 B2
11. A. Fujita, S. Fujieda, Y. Hasegawa, and K. Fukamichi, Phys. Rev. B, V-67, 104416 (2003).

We claim:

1. A magnetocaloric alloy having one of the following compositions:

$LaFe_{13-z}Si_{z-y}X_y$, where X=at least one of Al, Ga, and In with $1.1 \leq z \leq 1.9$ and $0.01 \leq y \leq 0.5$ $La(Fe_{1-w}M_w)_{13-z}Si_{z-y}X_y$, where X=at least one of Al, Ga, and In, and M=at least one of Co, Mn, Cr, and V with $0.05 \leq w \leq 0.1$, and $1.1 \leq z \leq 1.9$, and $0.01 \leq y \leq 0.5$ $LaFe_{13-z}Si_{z-y}X_yH_v$, where X=at least one of Al, Ga, and In with $1.1 \leq z \leq 1.9$, $0.01 \leq y \leq 0.5$, $0 < v \leq 2.3$ $La(Fe_{1-w}M_w)_{13-z}Si_{z-y}X_yH_v$, where X=at least one of Al, Ga, and In, and M=at least one of Co, Mn, Cr, and V with $0.05 \leq w \leq 0.1$, and $1.1 \leq z \leq 1.9$, and $0.01 \leq y \leq 0.5$, and $0 < v \leq 2.3$ wherein the value of y is selected to reduce brittleness of the alloy as compared to an identical alloy devoid of Al, Ga, and In to increase the number of temperature/magnetic field cycles without alloy cracking or decrepitation.

2. The alloy of claim 1 exhibiting large magnetocaloric effect that is tunable between about 170K and about 350K.

3. The alloy of claim 1 exhibiting increased thermal conductivity as compared to an identical La—Fe—Si alloy devoid of Al, Ga, and In.

4. The alloy of claim 1 that is machinable.

* * * * *